United States Patent
Higashi

(10) Patent No.: US 11,675,548 B2
(45) Date of Patent: Jun. 13, 2023

(54) PRINTING APPARATUS, PRINTING SYSTEM, INFORMATION PROCESSING APPARATUS AND MEDIUM

(71) Applicant: CANON KABUSHIKI KAISHA, Tokyo (JP)

(72) Inventor: Shogo Higashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/529,381

(22) Filed: Nov. 18, 2021

(65) Prior Publication Data

US 2022/0171582 A1 Jun. 2, 2022

(30) Foreign Application Priority Data

Dec. 2, 2020 (JP) .............................. JP2020-200507

(51) Int. Cl.
*G06F 3/12* (2006.01)

(52) U.S. Cl.
CPC .......... *G06F 3/1208* (2013.01); *G06F 3/1253* (2013.01); *G06F 3/1288* (2013.01); *G06F 3/1204* (2013.01)

(58) Field of Classification Search
CPC .... G06F 3/1208; G06F 3/1253; G06F 3/1288; G06F 3/1257; G06F 3/1203; G06F 3/1211; G06F 3/1237; G06F 3/12; H04N 1/6097; H04N 1/60
USPC ........................................................ 358/1.9
See application file for complete search history.

(56) References Cited

U.S. PATENT DOCUMENTS

| | | | |
|---|---|---|---|
| 7,677,821 B2* | 3/2010 | Kinoshita | H04N 1/6097 400/62 |
| 2007/0014616 A1 | 1/2007 | Kinoshita | |
| 2007/0086050 A1 | 4/2007 | Matsuda | |
| 2008/0024807 A1* | 1/2008 | Matsuda | G03G 15/5087 358/1.12 |
| 2008/0180727 A1 | 7/2008 | Chatow et al. | |
| 2011/0075173 A1 | 3/2011 | Katayama | |
| 2013/0038886 A1* | 2/2013 | Kondo | H04N 1/603 358/1.9 |
| 2018/0129455 A1* | 5/2018 | Hirasawa | G06F 3/1257 |

* cited by examiner

FOREIGN PATENT DOCUMENTS

JP 2007-025775 A 2/2007

OTHER PUBLICATIONS

Great Britain Search and Examination Report dated Jul. 15, 2022, in related Great Britain Patent Application No. GB2116217.7.

*Primary Examiner* — Darryl V Dottin
(74) *Attorney, Agent, or Firm* — Venable LLP

(57) ABSTRACT

A printing apparatus includes a storage that stores a table that associates a type of a print medium with an output profile, a memory device that stores a set of instructions, and at least one processor that executes the set of instructions to determine whether or not an output profile has been designated by a print job to be processed for a page included in the print job, perform color conversion for the page using the output profile designated by the print job without referring to the table and printing in a case where it is determined the output profile has been designated by the print job, and referring to the table, perform color conversion for the page using the output profile associated with a type of a print medium and printing in a case where it is determined the output profile has not been designated by the print job.

12 Claims, 19 Drawing Sheets

FIG. 4

| | |
|---|---|
| OPERATING SYSTEM | 401 |
| DATA TRANSMISSION/RECEPTION PROGRAM | 402 |
| COPY FUNCTION PROGRAM | 403 |
| SCAN FUNCTION PROGRAM | 404 |
| PDL FUNCTION PROGRAM | 405 |
| JDF FUNCTION PROGRAM | 406 |
| BOX FUNCTION PROGRAM | 407 |
| HOLD FUNCTION PROGRAM | 408 |
| UI FUNCTION PROGRAM | 409 |
| MEDIUM MANAGEMENT PROGRAM | 410 |
| JOB MANAGEMENT PROGRAM | 411 |

FIG. 5

| | |
|---|---|
| OPERATING SYSTEM | 501 |
| DEVICE DRIVER | 502 |
| PRINT APPLICATION PROGRAM | 503 |
| NETWORK CONTROL PROGRAM | 504 |
| OTHER PROGRAMS | 505 |

FIG. 9A

PREVIEW

| P1 | P2 |
| P3 | P4 |
| P5 | P6 |

PAPER SETTING

| PAGE | SHEET | MEDIA TYPE |
|---|---|---|
| 1 | 1 | Paper1 |
| 2 | | |
| 3 | 2 | |
| 4 | | |
| 5 | 3 | |
| 6 | | |
| 7 | 4 | |
| 8 | | |

901

INSERT SHEET
COPY PAGE
ADHERE PAGE
DELETE PAGE
CHANGE MEDIA TYPE
ADVANCED PAGE SETTINGS

TRANSMIT JOB

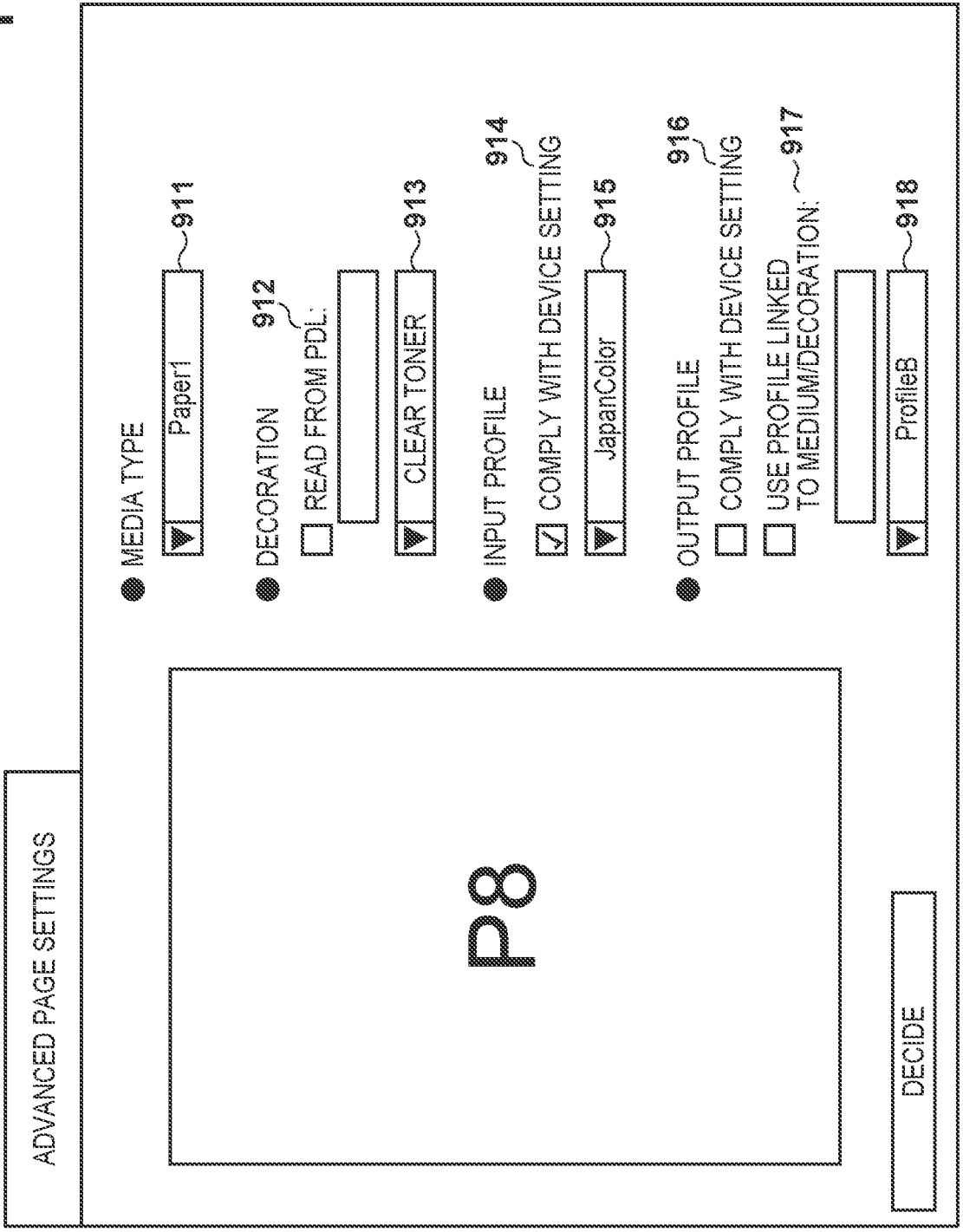

FIG. 10B

```xml
<?xml version="1.0" encoding="UTF-8" standalone="no"?>
<JDF xmlns="http://www.CIP4.org/JDFSchema_1_1" xmlns:cj="http://www.canon.com/ns/CanonJDF"
Activation="Active" Category="DigitalPrinting" DescriptiveName="test" ICSVersions="IDP_L1-1.0 Base_L1-1.0"
ID="IDOI" JobID="JobID01" JobPartID="JobPartID01" MaxVersion="1.5" Status="Ready" Type="Combined"
Types="LayoutPreparation Imposition Interpreting Rendering ColorSpaceConversion Digital Printing" Version="1.5"
cj:OwnerName="User">
 <ResourcePool>
  <RunList Class="Parameter" ID="IDRL" PartIDKeys="Run" Status="Available">
   <RunList Run="0">
    <LayoutElement>
     <FileSpec MimeType="application/pdf" URL="cid:AAA"/>
    </LayoutElement>
   </RunList>
  </RunList>
  <LayoutPreparationParams Class="Parameter" ID="IDLPP" Sides="TwoSidedFlipY" Status="Available"/>
  <ColorantControl Class="Parameter" ID="IDCC" Status="Available"/>
  <InterpretingParams Class="Parameter" ID="IDIP" Status="Available"/>
  <RenderingParams Class="Parameter" ID="IDRP" Status="Available"/>
  <ColorSpaceConversionParams Class="Parameter" ID="IDCSCP" PartIDKeys="RunIndex" Status="Available">
   <ColorSpaceConversionParams RunIndex="0~1">
    <FileSpec ResourceUsage="FinalTargetDevice" UserFileName="ProfileA"/>
   </ColorSpaceConversionParams>
   <ColorSpaceConversionParams RunIndex="7~7">
    <FileSpec ResourceUsage="FinalTargetDevice" UserFileName="ProfileB"/>
   </ColorSpaceConversionParams>
  </ColorSpaceConversionParams>
  <DigitalPrintingParams Class="Parameter" ID="IDDPP" PartIDKeys="RunIndex" Status="Available">
   <MediaRef rRef="MED_000"/>
  </DigitalPrintingParams>
  <Component Class="Quantity" ComponentType="FinalProduct" ID="IDC_DPP" Status="Unavailable"/>
  <Media Class="Consumable" Dimension="842 595" ID="MED_000" Status="Available"
   DescriptionName="Paper1"/>
 </ResourcePool>
 ...
</JDF>
```

| PAGE | SHEET | MEDIA TYPE |
|---|---|---|
| 1 | 1 | Paper1 |
| 2 | | |
| 3 | 2 | |
| 4 | | |
| 5 | 3 | |
| 6 | | |
| 7 | 4 | |
| 8 | | |

USE OUTPUT PROFILE BASED ON REGISTERED TABLE

TRANSMIT JOB

F I G. 13A

```xml
...
<LayoutPreparationParams Class="Parameter" ID="IDLPP" Sides="TwoSidedFlipY" Status="Available"/>
<ColorantControl Class="Parameter" ID="IDCC" Status="Available"/>
<InterpretingParams Class="Parameter" ID="IDIP" Status="Available"/>
<RenderingParams Class="Parameter" ID="IDRP" Status="Available"/>
<ColorSpaceConversionParams Class="Parameter" ID="IDCSCP" PartIDKeys="RunIndex cj:Scope_Decorating cj:Media_ID" Status="Available">      ┌─1301
    <ColorSpaceConversionParams cj:Scope_Decorating="Laminate" cj:Media_ID="MED_000">   ┌─1302
        <FileSpec ResourceUsage="FinalTargetDevice" UserFileName="ProfileA"/>
    </ColorSpaceConversionParams>
    <ColorSpaceConversionParams cj:Scope_Decorating="ClearToner" cj:Media_ID="MED_000">  ┌─1303
        <FileSpec ResourceUsage="FinalTargetDevice" UserFileName="ProfileB"/>
    </ColorSpaceConversionParams>
</ColorSpaceConversionParams>
<DigitalPrintingParams Class="Parameter" ID="IDDPP" PartIDKeys="RunIndex" Status="Available">
    <MediaRef rRef="MED_000"/>
</DigitalPrintingParams>
<Component Class="Quantity" ComponentType="FinalProduct" ID="IDC_DPP" Status="Unavailable"/>
<Media Class="Consumable" Dimension="842 595" ID="MED_000" Status="Available" DescriptiveName="Paper1"/>
...
```

FIG. 14

| FRONT | | | | |
|---|---|---|---|---|
| | HAS DECORATION (LAMINATION) | NO SPOT COLOR | NO SPOT COLOR | NO SPOT COLOR |
| SHEET NUMBER | 1 | 2 | 3 | 4 |
| PAGE NUMBER | 1 | 3 | 5 | 7 |
| OUTPUT PROFILE | ProfileA | ProfileX(MLP) | ProfileX(MLP) | ProfileX(MLP) |

| BACK | | | | |
|---|---|---|---|---|
| | HAS DECORATION (LAMINATION) | NO SPOT COLOR | NO SPOT COLOR | HAS DECORATION (CLEAR TONER) |
| SHEET NUMBER | 1 | 2 | 3 | 4 |
| PAGE NUMBER | 2 | 4 | 6 | 8 |
| OUTPUT PROFILE | ProfileA | ProfileX(MLP) | ProfileX(MLP) | ProfileB |

FIG. 15

SET FOR Paper1

SET MEDIUM LINK PROFILE

▼ DEFAULT (NO DECORATION)
▼ ProfileX

▼ LAMINATION
▼ ProfileA

▼ CLEAR TONER
▼ ProfileB

+ ADD DECORATION CONDITION

US 11,675,548 B2

PRINTING APPARATUS, PRINTING SYSTEM, INFORMATION PROCESSING APPARATUS AND MEDIUM

BACKGROUND OF THE INVENTION

Field of the Invention

The present invention relates to a printing apparatus, a printing system, an information processing apparatus and a medium.

Description of the Related Art

In commercial printing, a print file created by graphic software or the like (a file described in PDL (Page Description Language)) is submitted to a print company. In this case, the color of a submitted PDL and the color of an actual printed product may be different because of the difference between a color gamut that can be expressed by the RGB color space that is a color space used in graphic software and a color gamut that can be expressed by the CMYK color space that is a color space used in printing. In addition, the RGB color space and the CMYK color space are color spaces depending on output devices. Even in the same color space and the same color value, the color changes depending on the output device.

To solve the above-described problem, there is known a method of suppressing an error in color between input data and an output product by performing color conversion using a corresponding table to a device-independent color space, which is called a profile. Here, the device-independent color space is, for example, a Lab color space or the like.

When performing the above-described color conversion, input data is converted into intermediate data expressed by a device-independent color space using an input profile created in consideration of a color space and a device characteristic on the input side. Then, the intermediate data is converted into output data using an output profile created in consideration of a color space and a device characteristic on the output side.

At this time, to print in a correct color, the output profile needs to be created in consideration of not only the device characteristic but also the surface properties and thickness of a print medium. Hence, the output profile is preferably prepared for each print medium.

To appropriately use the plurality of prepared profiles, there has been proposed a measure of linking the output profiles with print media in advance, thereby automatically applying a linked output profile without setting an output profile for each job (see Japanese Patent Laid-Open No. 2007-25775). A profile linked with a medium by this function will be referred to as an MLP (Media Link Profile) hereinafter.

According to this, image processing information including an output profile is linked with each of the obverse and reverse surfaces of a print medium and saved, and image processing based on the image processing information linked with the surface on which an image is to be printed is performed for the image.

According to the above-described conventional technique, at the time of double-sided printing or printing to a plurality of types of paper sheets, it is unnecessary to grasp the medium characteristic of a page on which each image is to be printed every time and then set image processing information for each page. For this reason, setting is easy, and setting errors can be eliminated. However, how to cope with a case in which an output profile needs to be adjusted in accordance with decoration on a print medium is not taken into consideration.

As described above, basically, use of an MLP facilitates the setting. However, if decoration such as lamination processing is performed for a print medium, an MLP may be unable to reproduce a color as expected.

In the conventional technique, if decoration is performed for a print medium, as described above, it is necessary to change the setting of using an MLP and setting an output profile for each page anew. In this case, for example, even if decoration is performed for only one page, output profiles need to be newly set for all pages, and it is impossible to take full advantage of MLPs.

SUMMARY OF THE INVENTION

The present invention easily sets an output profile suitable for excellent color development and creates a high-quality printed product.

The present invention has the following configurations. That is, according to one aspect of the present invention, a printing apparatus is provided that comprises: a storage that stores a table that associates a type of a print medium with an output profile; and a processor that performs, for each page included in a print job of a processing target, color conversion using an output profile for a page for which the output profile is set in the print job, and performing color conversion using an output profile associated with the type of the print medium set for the page by referring to the table for a page for which an output profile is not set in the print job, and for executing printing.

According to another aspect of the present invention, a printing system is provided that includes an information processing apparatus configured to create a print job and a printing apparatus configured to perform printing by executing the print job, the information processing apparatus comprising: a storage that stores a first table that associates a type of a print medium, a type of decoration processing, and an output profile; at least one memory that stores at least one program; and at least one processor, the at least one program causing the at least one processor to function as: a creation unit that sets the type of the print medium and the type of the decoration processing for each page and creating, by referring to the first table, a print job in which the output profile of a page for which the decoration processing is set; and a transmitting unit that transmits the print job to the printing apparatus, and the printing apparatus comprising: a storage that stores a second table that associates a type of a print medium with an output profile; and a processor that performs, for each page included in the print job, color conversion using an output profile for a page for which an output profile is set in the print job, and performing color conversion using an output profile associated with the type of the print medium set for the page by referring to the second table for a page for which the output profile is not set in the print job, and for executing printing.

According to still another aspect of the present invention, an information processing apparatus is provided for creating a print job, comprising: a storage that stores a table that associates a type of a print medium, a type of decoration processing, and an output profile; at least one memory that stores at least one program; and at least one processor, the at least one program causing the at least one processor to function as: a creation unit that sets the type of the print medium and the type of the decoration processing for each page and creating, by referring to the first table, a print job in which the output profile of a page for which the decoration processing is set; and a transmitting unit that transmits the print job to the printing apparatus.

According to the present invention, it is possible to easily set an output profile suitable for excellent color development and create a high-quality printed product.

Further features of the present invention will become apparent from the following description of embodiments with reference to the attached drawings.

BRIEF DESCRIPTION OF THE DRAWINGS

FIG. 4 is a view showing the software configuration of the printing apparatus;

FIG. 5 is a view showing the software configuration of the information processing apparatus;

FIG. 9A is a view showing an example of a UI configured to set a use medium for each print sheet;

FIG. 9B is a view showing an example of a UI configured to set decoration and output profile information for each print page;

FIG. 10B is a view showing an example of a job ticket that designates an output profile for a specific page while applying an MLP;

FIG. 13A is a view showing an example of a job ticket that designates an output profile for decoration processing;

FIG. 14 is a view showing that an output profile is appropriately applied to a job with decoration;

FIG. 15 is a view showing an example of a profile setting screen according to decoration of an MFP.

DESCRIPTION OF THE EMBODIMENTS

Figure 1:
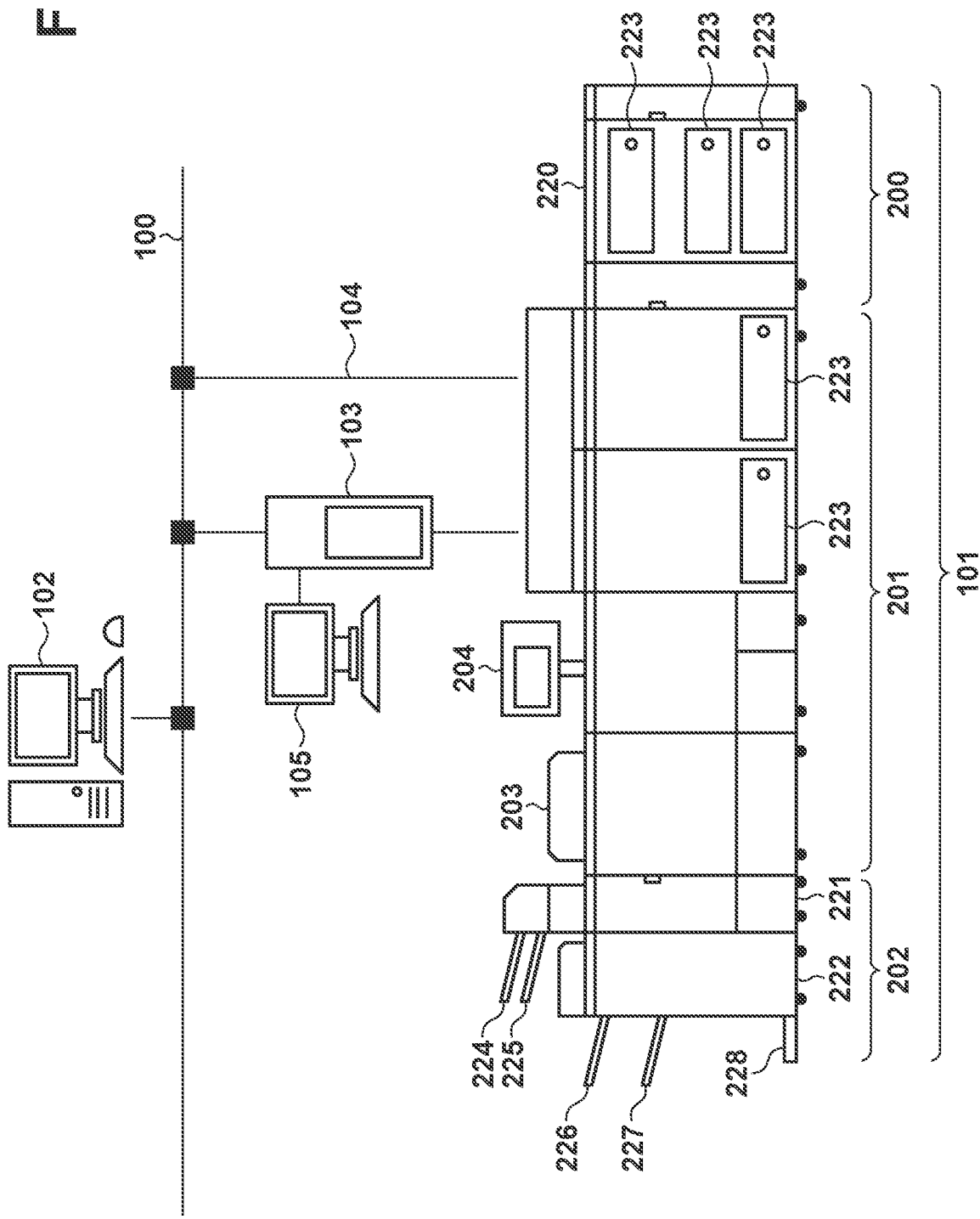
FIG. 1 is a block diagram showing the configuration of an entire system.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted. Each of the embodiments of the present invention described below can be implemented solely or as a combination of a plurality of the embodiments or features thereof where necessary or where the combination of elements or features from individual embodiments in a single embodiment is beneficial.

<Description of System Configuration>

FIG. 1 is a block diagram showing a print processing system according to an embodiment of the present invention. In this embodiment, an MFP (Multifunction Peripheral) will be described as an example of a printing apparatus 101, and an information processing apparatus 102 will be described as an example of an information processing apparatus. The MFP is also called a multifunction copying machine, and is also called an image forming apparatus with focus on an image forming function. The print processing system may be called a printing system or an image forming system. In the print processing system, the printing apparatus 101 and the information processing apparatus 102 are communicably connected via a network 100.

Note that FIG. 1 shows a case in which one information processing apparatus 102 is provided in the print processing system. The printing apparatus 101 and a plurality of information processing apparatuses may communicably be connected via the network 100, and the number of information processing apparatuses is not particularly limited. Also, the print processing system according to this embodiment includes a printing apparatus and an information processing apparatus, but is not limited to this. For example, a printing apparatus may be defined as a print processing system. In this case, the printing apparatus 101 plays the functions that the information processing apparatus 102 according to this embodiment plays.

Information Processing Apparatus

The information processing apparatus 102 will be described first. The information processing apparatus 102 can execute various kinds of programs such as an application program configured to submit a print job (to be sometimes simply referred to as a job hereinafter). In addition, a printer driver having a function of converting the original data of a document or an image into print data described in a printer language corresponding to the printing apparatus 101 is installed in the information processing apparatus 102. A user who wants to print can input a print instruction from various kinds of applications. The printer driver can convert, based on a print instruction, data output from an application into print data interpretable by the printing apparatus 101 and transmit the print data to the printing apparatus 101 connected to the network 100.

Note that in this embodiment, a PC has been shown as an example of the information processing apparatus. However, the information processing apparatus may be, for example, a portable information terminal such as a smartphone or a tablet terminal. Note that the method of transmitting print data to the printing apparatus can appropriately be modified. Print data may be transmitted to the printing apparatus 101 via an application or a driver for printing, or print data may be transmitted to the printing apparatus 101 via a cloud server.

Printing Apparatus

The printing apparatus 101 will be described next. The printing apparatus 101 has a reading function of reading an image on a sheet, and a printing function of printing an image on a sheet. The printing apparatus 101 also has a post-processing function of binding a plurality of sheets with printed images, aligning a plurality of sheets, and dividing the discharge destination of a plurality of sheets to a plurality of trays. Note that sheets include paper sheets such as plain paper and thick paper, a film, and the like.

In this embodiment, the printing apparatus 101 will be described as an example of a printing apparatus. However, it may be a printing apparatus such as a printer that does not have the reading function. A configuration in which a device 103 having some of the functions of the printing apparatus 101 or other adjunctive functions is added to the MFP may be employed. In this case, from the viewpoint of the information processing apparatus 102, it can be considered that the device 103 provides the functions of the printing apparatus 101 via the network 100. Various kinds of input/output devices such as, for example, a monitor 105, which are similar to those of the information processing apparatus 102, can be added to the device 103. Even if the additional device 103 is attached, the printing apparatus 101 may be configured to be connectable to the network 100 directly using a network cable 104.

The printing apparatus 101 is configured to be able to perform complex sheet processing by connecting devices having a plurality of different roles to each other. The parts constituting the printing apparatus 101 will be described below.

Based on image data, a printer unit 201 forms (prints) an image on a sheet fed from a paper feeding unit using toner. The configuration and operation principle of the printer unit 201 are as follows.

A light beam, for example, a laser beam modulated in accordance with the image data is reflected by a rotary polygonal mirror (a polygon mirror or the like), and the reflected light scans and exposes the surface of a photosensitive drum. An electrostatic latent image formed on the photosensitive drum by the laser beam is developed by toner, and the toner image is transferred to a sheet adhered to a transfer drum. The series of image forming processes are sequentially executed for yellow (Y), magenta (M), cyan (C), and black (K) toners, thereby forming a full-color image on the sheet. A configuration capable of transferring toner called spot color toner or transparent toner in addition to the four colors may be used. In this way, the sheet on which the full-color image is formed is conveyed to a fixing device. The fixing device includes a roller, a belt, and the like. A heat source such as a halogen heater is incorporated in the roller, and the toner on the sheet to which the toner image is transferred is dissolved by heat and pressure and fixed to the sheet.

Note that the printer unit 201 of the printing apparatus 101 according to this embodiment includes a scanner 203 and an operation unit 204 arranged on the upper surface of the printer unit 201. The operation unit 204 provides various kinds of interfaces when the user performs various kinds of settings and operations of the printer unit 201 according to this embodiment. The operation unit 204 according to this embodiment includes the settings of the printing apparatus shown in FIG. 11, that is, "medium link profile use designation", "output profile designation", and "output profile designation in decoration". Details of the settings will be described later.

Also, the printing apparatus 101 is configured to be able to attach various kinds of additional devices in addition to the printer unit 201.

A large-capacity paper feeding device 220 is a paper feeding device detachable from the printer unit 201. The paper feeding device includes a plurality of paper feeding units 223. With this configuration, the printer unit 201 can perform print processing for large-capacity sheets.

An inserter 221 is a device used to insert a sheet without image formation into the product of sheets created by the printer unit 201. FIG. 1 shows a device including two trays 224 and 225.

The printing apparatus 101 can roughly be divided into three parts from the printer unit 201 as the boundary. Referring to FIG. 1, a device denoted by reference numeral 200, which is arranged on the right side of the printer unit 201, is called a paper feeding system device. The main function of the paper feeding system device is to supply sheets loaded inside to the printer unit 201 continuously at appropriate timings. Also, the paper feeding system device detects the remaining amount of sheets loaded inside. The paper feeding units 223 exist inside the printer unit 201 as well and can execute an operation similar to the paper feeding system device in terms of function. Even the paper feeding units provided in the printer unit 201 are referred to as a paper feeding system device in the description.

On the other hand, in FIG. 1, a device denoted by reference numeral 202, which is arranged on the left side of the printer unit 201, is called a sheet working device. This device is also called a sheet processing device or a post-processing device. The sheet working device performs processing of, for example, applying various kinds of working processes to sheets that have undergone the print processing or integrating the sheets. In the following description, the paper feeding system device 200 and the sheet working device 202 described above will be referred to as the sheet processing devices 200 and 202.

A printed sheet (printed product), for which image formation is completed, and post-processing according to settings is performed, or an inserted sheet is discharged to a discharge tray 226 or 227 or a discharge deck 228 in accordance with the settings.

<Description of Printing Apparatus 101>

Figure 2:
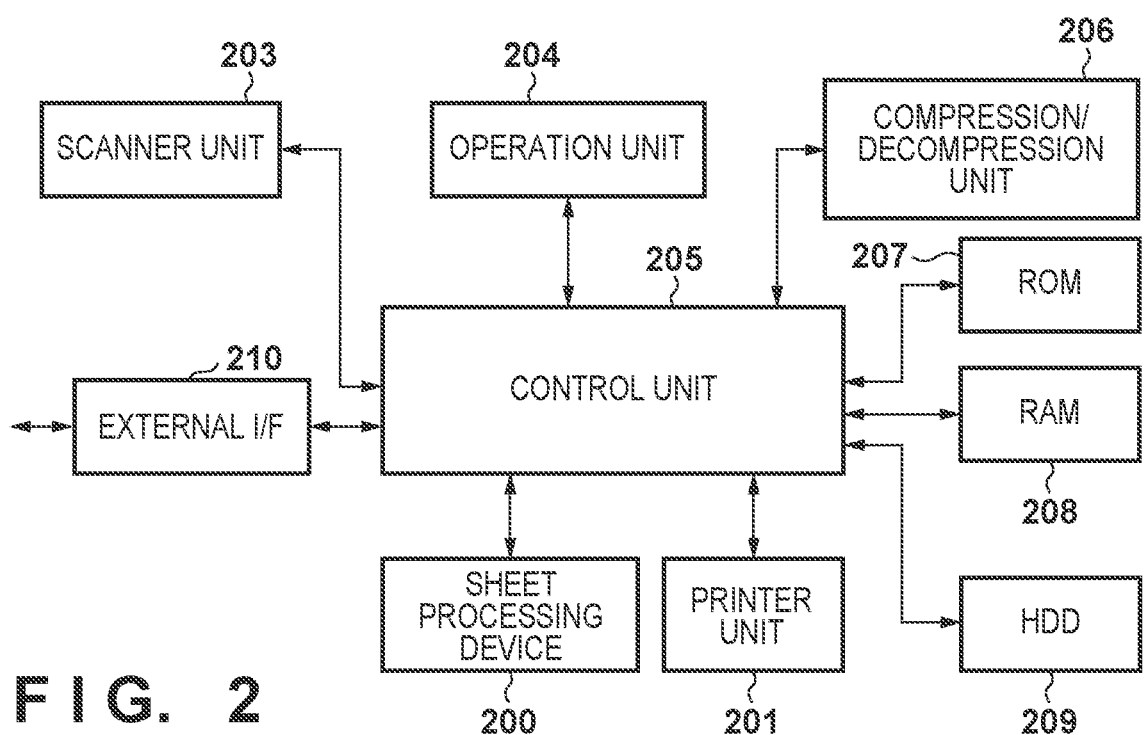
FIG. 2 is a block diagram showing the hardware configuration of a printing apparatus.

FIG. 2 is a block diagram for explaining the hardware configuration of the printing apparatus 101. The printing apparatus 101 has a reading function of reading an image on a sheet, and a printing function of printing an image on a sheet. The printing apparatus 101 also has a post-processing function of binding a plurality of sheets with printed images, aligning a plurality of sheets, and dividing the discharge destination of a plurality of sheets to a plurality of trays. Note that sheets include paper sheets such as plain paper and thick paper, a film sheet, and the like.

The printing apparatus 101 shown in FIG. 2 is configured to be able to perform complex sheet processing by connecting devices having a plurality of different roles to each other.

The printing apparatus 101 also has a copy function of storing, in an HDD 209, data accepted from the scanner unit 203, reading out the data from the HDD 209, and printing it by the printer unit 201. The printing apparatus 101 also has a printing function of storing, in the HDD 209, job data received from an external device via an external I/F unit 210 that is an example of a communication unit, reading out the job data from the HDD 209, and printing it by the printer unit 201. The printing apparatus 101 is a multifunction processing apparatus (MFP) (also called a printing apparatus) having such a plurality of functions. Note that the printing apparatus 101 may be able to perform color printing or monochrome printing.

The scanner unit 203 reads an original image, performs image processing for image data obtained by reading the original, and outputs the image data.

The CPU of a control device 205 reads out and executes programs stored in a ROM 207 and the HDD 209, thereby causing the printing apparatus 101 to execute various kinds of operations according to this embodiment. The ROM 207 also stores a program configured to cause the control device 205 to perform an operation of interpreting page description language (to be abbreviated as PDL hereinafter) data received from an external device via the external I/F 210 and rasterizing the data into raster image data (bitmap image data). Similarly, the ROM 207 stores a program configured to cause the control device 205 to interpret and process a job received from an external device via the external I/F 210. The ROM 207 is a read only memory and stores programs such as a boot sequence and font information and various kinds of programs such as the above-described programs in advance. Details of the various kinds of programs stored in the ROM 207 will be described later. A RAM 208 is a readable/writable memory and stores image data sent from the scanner 203 or the external I/F 210, various kinds of programs, setting information, and the like.

The HDD 209 stores image data compressed by a compression/decompression unit 206. The HDD 209 is configured to be able to hold a plurality of data such as print data of a job that is a processing target. The control device 205 stores, in the HDD 209, data of a job as a processing target, which is input via various kinds of input units such as the scanner unit 203 and the external I/F 210, reads out the data from the HDD 209, and outputs it to the printer unit 201 to print. The control device 205 also controls to transmit the job data read out from the HDD 209 to an external device via the external I/F 210. As described above, the control device 205 executes various kinds of output processing of the data of the processing target job stored in the HDD 209. The compression/decompression unit 206 compresses or decompresses image data and the like stored in the RAM 208 and the HDD 209, using various kinds of compression methods such as JBIG and JPEG. The control device 205 also controls the operations of the sheet processing devices 200 and 202. The sheet processing devices 200 and 202 correspond to the paper feeding system device and the sheet working device described with reference to FIG. 1.

The external I/F 210 transmits/receives image data and the like to/from a facsimile apparatus, a network connected device, or an external dedicated device. The HDD 209 also stores various kinds of management information permanently stored, changed, and managed by the printing apparatus 101. The printing apparatus 101 includes the printer unit 201 that executes print processing of the data of a job as a print target stored in the HDD 209. The printing apparatus 101 also includes the operation unit 204 including a display unit corresponding to an example of a user interface unit. The control device 205 corresponding to an example of a control device provided in the printing apparatus 101 includes a CPU (not shown), and comprehensively controls the processing, operations, and the like of various kinds of units provided in the printing apparatus 101. The ROM 207 stores various kinds of control programs necessary in this embodiment, including programs configured to execute various kinds of processing of flowcharts to be described later, which are executed by the control device 205. In addition, the ROM 207 stores a display control program configured to display various kinds of UI screens on the display unit of the operation unit 204, including user interface screens (to be referred to as UI screens hereinafter).

<Description of Information Processing Apparatus 102>

Figure 3:
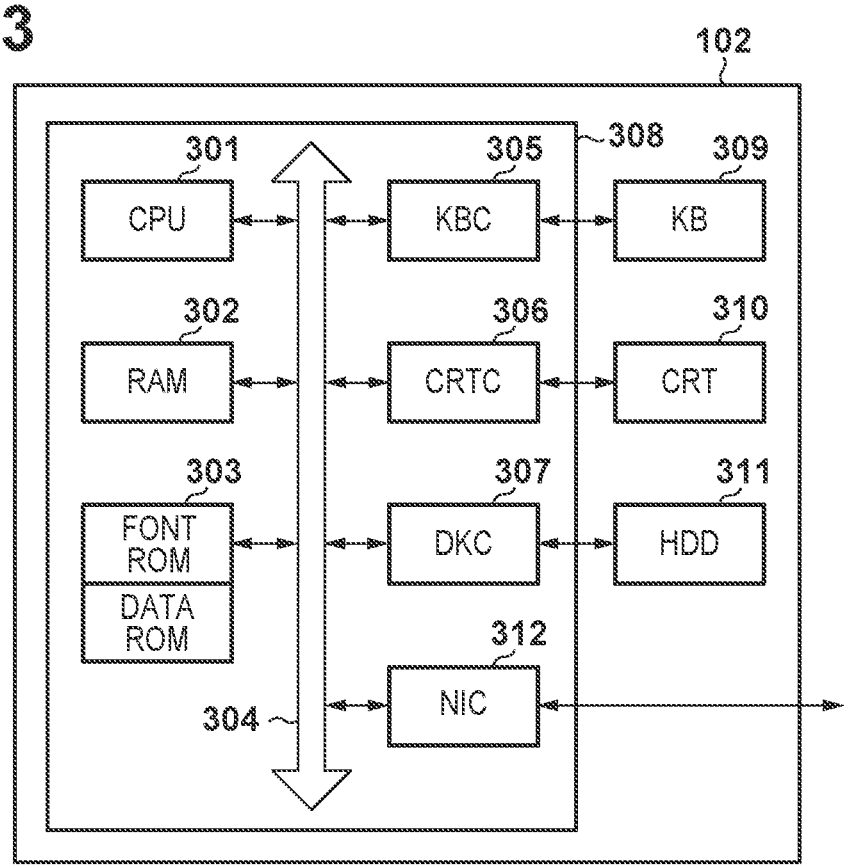
FIG. 3 is a block diagram showing the hardware configuration of an information processing apparatus.

FIG. 3 is a block diagram showing the configuration of the information processing apparatus (PC) 102 according to this embodiment.

Referring to FIG. 3, a CPU 301 executes programs such as an OS, general applications, and bookbinding applications stored in the program ROM of a ROM 303 or loaded from an HDD 311 into a RAM 302. The ROM 303 also includes a font ROM and a data ROM. The RAM 302 functions as the main memory, the work area, and the like of the CPU 301. A keyboard controller (KBC) 305 controls input from a keyboard (KB) 309 or a pointing device (not shown). A display controller (CRTC) 306 controls display on a display unit (CRT) 310. A disk controller (DKC) 307 controls access to the HDD 311 and the like, which store a boot program, various kinds of applications, font data, user files, and the like. A network controller (NC) 312 is connected to the network 100 and executes communication control processing for other devices connected to the network 100. A bus 304 connects the CPU 301 to the RAM 302, the ROM 303, and various kinds of controllers, and conveys data signals and control signals.

<Software Configuration of Printing Apparatus 101>

FIG. 4 is a view for explaining the programs of the printing apparatus 101 according to this embodiment. These programs are stored in the ROM 207, read out by the control device 205 of the printing apparatus 101, particularly, the CPU or processor thereof, and executed.

An operating system 401 is a program aiming at providing an execution environment for various kinds of programs configured to implement the functions of the printing apparatus 101. This mainly provides functions such as resource management for the memories of the printing apparatus 101, that is, the ROM 207, the RAM 208, and the HDD 209 and basic input/output control of the units shown in FIG. 2.

A data transmission/reception program 402 performs transmission/reception processing when a data input/output request occurs via the external I/F 210. More specifically, the program incorporates a protocol stack such as TCP/IP and controls communication of various kinds of data transmitted/received to/from an external device connected via the network 100. The communication processing performed here is processing specialized to the transmission/reception level of a data packet or communication processing of an HTTP server and does not include analysis processing concerning the contents of received data to be described later. Data analysis processing is executed by the control device 205 based on the description contents of another program.

A copy function program 403 is a program configured to execute a copy function that is executed by the control device 205 in accordance with an instruction from the operation unit 204 when the user of the printing apparatus 101 instructs execution of the copy function from the operation unit 204. In the copy function performed by the control device 205, the operations of the devices as the resources of the printing apparatus 101 are sequentially instructed by the control device 205 in an appropriate order based on a processing order and processing conditions described in this program. Control is performed such that copy processing is thus finally executed. The devices include the scanner unit 203, the printer unit 201, the sheet processing devices 200 and 202, the HDD 209, the compression/decompression unit 206, the RAM 208, and the like.

A scan function program 404 is a program configured to execute a scan function that is executed by the control device 205 in accordance with an instruction from the operation unit 204 when the user of the printing apparatus 101 instructs execution of the scan function from the operation unit 204. Modules such as the scanner unit 203, the HDD 209, the compression/decompression unit 206, and the RAM 208 are controlled by the control device 205 in accordance with a processing order and processing conditions described in this program. At this time, control is performed such that scan processing is finally executed by sequentially instructing the operations of the devices in an appropriate order.

A PDL function program 405 executes a PDL function that is executed by the control device 205 when PDL data (print job data) is received by the printing apparatus 101 via the external I/F 210. In the PDL function performed by the control device 205, analysis processing of a designated PDL file is performed, and a print image is created. In the analysis processing of the PDL file, print settings obtained by analyzing JDF by a JDF (Job Description Format) function program 406 are used. JDF is one of job ticket formats capable of making various designations concerning printing, such as imposition, paper feeding, discharge, finishing, and profile.

The JDF function program 406 is a program configured to execute a JDF function that is executed by the control device 205 in accordance with an instruction from the external I/F 210 when JDF job data is received by the printing apparatus 101 via the external I/F 210. In the JDF function performed by the control device 205, analysis processing of a received JDF is performed, and print settings to be used in printing are created. The JDF function program 406 according to this embodiment has a function of analyzing only the PDL portion of JDF and acquiring the URL of the PDL. The JDF function program 406 also has a function of creating various kinds of settings shown in the flowchart of FIG. 7. The JDF function program 406 also includes a program configured to perform discrimination processing of determining whether an incorrect setting is included in the JDF as the result of analysis and make a setting change to eliminate the incorrect setting.

A BOX function program 407 executes a BOX function that is executed by the control device 205 in accordance with an instruction from the operation unit 204 when the user of the printing apparatus 101 instructs execution of the BOX function from the operation unit 204. In the BOX function, BOX processing is executed by sequentially instructing the operations of the devices by the control device 205 in an appropriate order based on a processing order and processing conditions described in this program. The devices include the scanner unit 203, the printer unit 201, the sheet processing devices 200 and 202, the HDD 209, the compression/decompression unit 206, the RAM 208, and the like. As for the job data stored in the HDD 209 by the BOX function, it is also possible to change the settings of job at the time of storage and execute the job.

A hold function program 408 is a program that is executed by the control device 205 when the user of the printing apparatus 101 instructs execution of the hold function from the operation unit 204. The hold function is a function of storing print target data in the HDD 209 of the printing apparatus 101 until a print instruction is received from the user and then executing printing in accordance with data for which a print instruction is accepted from the user. In the hold function, print processing by job hold is executed by sequentially instructing the operations of the devices by the control device 205 in an appropriate order based on a processing order and processing conditions described in this program. The devices include the printer unit 201, the sheet processing devices 200 and 202, the HDD 209, the compression/decompression unit 206, the RAM 208, and the like. As for the stored job data, it is possible to change the settings at the time of storage and execute the job.

A UI function program 409 is the control program of the operation unit 204. The UI function program 409 identifies contents input from the operation unit 204 by the user of the printing apparatus 101 and performs appropriate screen transition and a processing request instruction for the control device 205.

A medium management program 410 is a program configured to execute a management function associated with sheets usable by the printing apparatus 101. Sheet associated information managed by the program is stored in the HDD 209.

A job management program 411 is a program configured to cause the printing apparatus 101 to manage, as a job, a series of processes created by programs such as the copy function program 403, the PDL function program 405, and the JDF function program 406. In a series of processes included in a job, RIP processing and print processing exist, and the number of simultaneously executable processes is limited. The job management program controls the order of these processes and also manages an execution result (log) and the like.

A job is executed by the control device 205. The procedure of control of the control device 205 at the time of job reception will be described later with reference to FIGS. 6A and 6B.

<Software Configuration of Information Processing Apparatus 102>

FIG. 5 is a view showing the configuration of programs held by the information processing apparatus 102 according to this embodiment.

An operating system 501 is a program aiming at providing an execution environment for various kinds of programs configured to implement the functions of the information processing apparatus 102. This mainly provides functions such as resource management for the memories of the information processing apparatus, that is, the ROM 303, the RAM 302, and the HDD 311.

A device driver 502 is a program configured to control various kinds of hardware connected to the information processing apparatus 102. The device driver 502 includes programs configured to control the keyboard controller 305, the display controller 306, the DKC 307, and the like.

A print application program 503 is the general term for programs that operate on the information processing apparatus 102 and aim at providing various kinds of functions and services to the user of the printing system. The print application program 503 has a function of creating or editing data of a print job. Also, the print application program 503 has a function of converting various kinds of print specifications set from the setting screen (not shown) of the application 503 into corresponding print settings. The print application program 503 also has a function of selecting a print setting file stored in the HDD 311 and creating print job data. As for the print settings, the print application program 503 has a capability of creating print job data by converting print settings into a job ticket in a PDL command format or JDF and obtaining the simple job ticket as print job data or combining the job ticket with print target data.

A network control program 504 is a program to be executed to transmit print job data created by the print application program 503 to the printing apparatus 101 connected via the network 100. The program 504 can also be configured to have a function of, for example, transmitting print data and, after the transmission, acquiring progress information of the print job executed by the printing apparatus 101. Acquisition of information can be implemented by, for example, a request and a response to that.

Other programs 505 include programs that do not fall under any of the above-described types, and a detailed description thereof will be omitted.

<Flowchart in Print Job Acceptance>

Figure 6A:
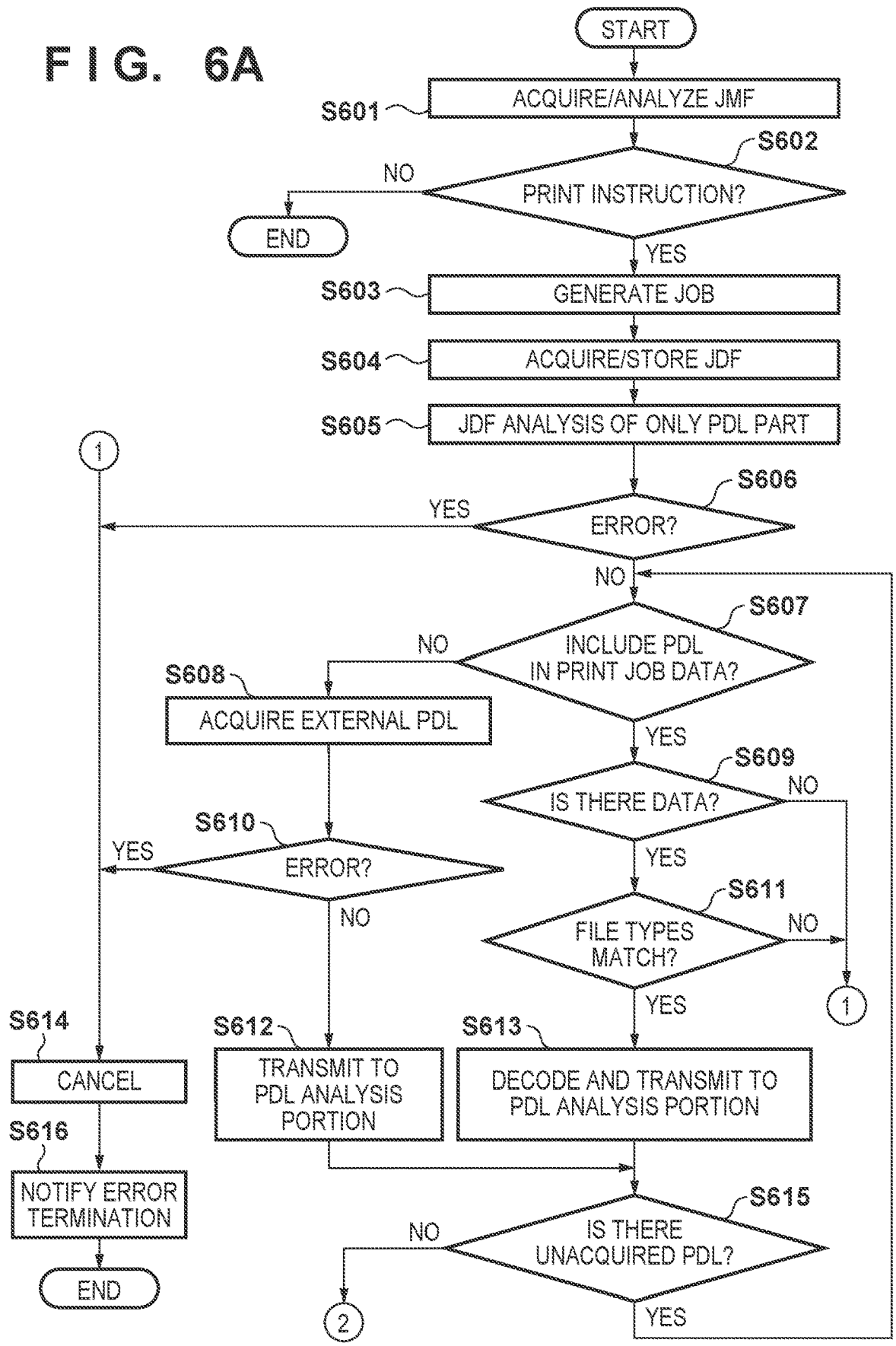
FIGS. 6A and 6B are flowcharts of processing of the information processing apparatus for a job request.
Figure 6B:
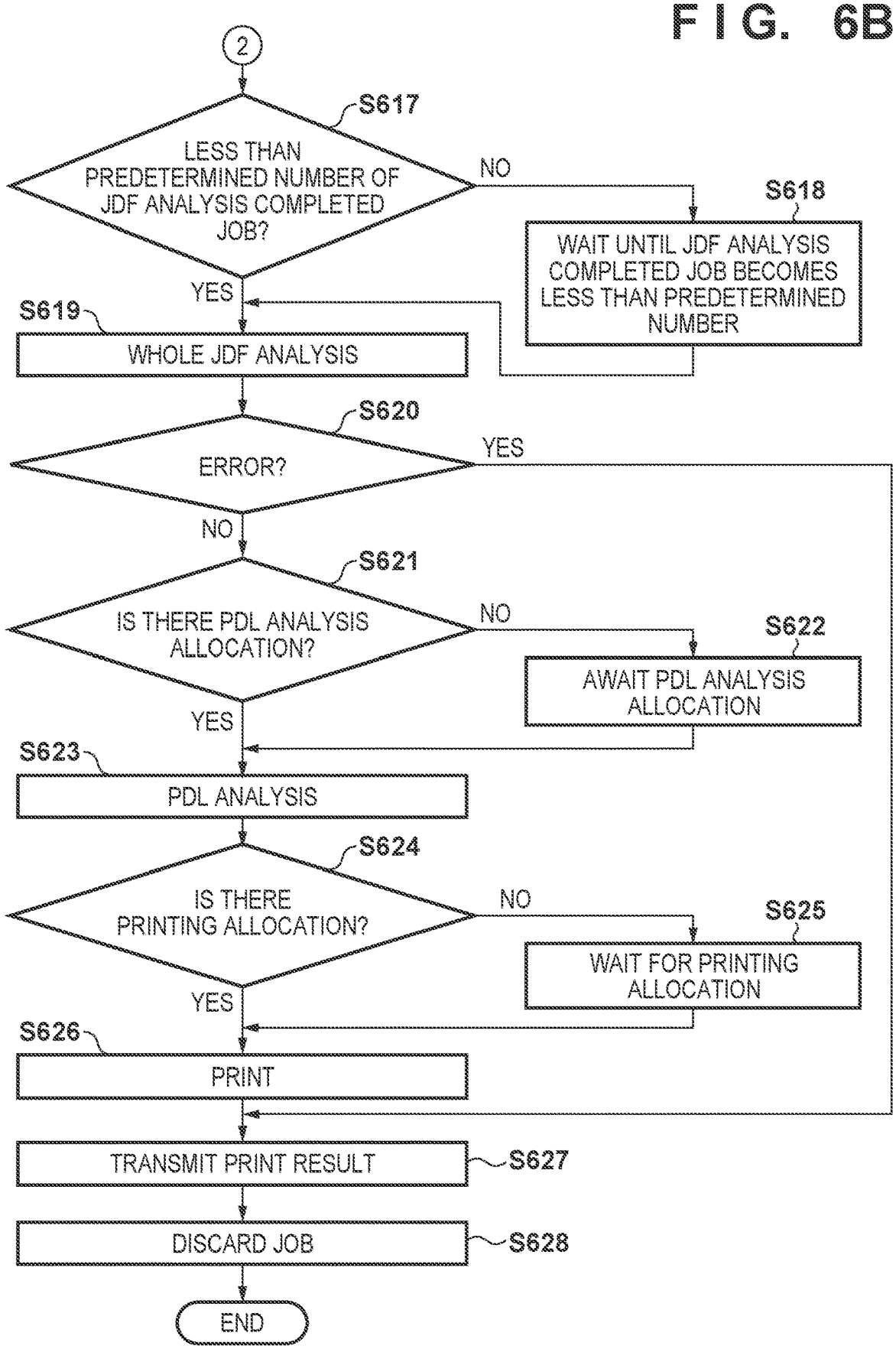

FIGS. 6A and 6B are flowcharts showing the procedure of control of the control device 205 of the printing apparatus 101 at the time of print job acceptance. The procedure starts when a print job is accepted from the information processing apparatus 102 via the external I/F 210. FIGS. 6A and 6B explain the procedure of processing mainly concerning an accepted print job.

In step S601, the control device 205 receives a JMF (Job Messaging Format) part of print job data transmitted from the information processing apparatus 102 via the external I/F 210 and executes the JDF function program 406, thereby analyzing the part. JMF is a communication-associated specification configured to control devices connected to a workflow based on an integrated command system. Using functions provided by the JMF, it is possible to submit a job or acquire various kinds of information from a device. The structure of print job data will be described with reference to FIG. 10A. When the JMF part is received and analyzed, the control device 205 advances the process to step S602.

In step S602, the control device 205 determines whether the received JMF is the message of a print instruction as the result of analysis of the JMF part. The message of a print instruction is Command-SubmitQueueEntry. Upon determining that the received JMF is the message of a print instruction, the control device 205 advances the process to step S603. Otherwise, the procedure is ended. Note that even if the JMF has an error, the procedure is ended.

In step S603, the control device 205 generates a job and, after the generation, advances the process to step S604.

In step S604, the control device 205 receives a JDF part of the print job data transmitted from the information processing apparatus 102 via the external I/F 210 and stores it in a file. After that, the control device 205 advances the process to step S605.

In step S605, the control device 205 analyzes only a PDL part of the JDF and stores necessary values. The stored values include at least the URL of the PDL and the value of an attribute that designates the type of the file. The PDL part of the JDF will be described later with reference to FIG. 10B. Analysis of JDF may be done by reading out the JDF file stored in step S604, or may be performed directly for the data read out from the external I/F 210 in step S604. When the analysis of the PDL part is ended, the control device 205 advances the process to step S606.

In step S606, the control device 205 determines whether an error has occurred in the PDL analysis in step S605. Upon determining that an error has occurred, the control device 205 branches the process to step S614. Upon determining that no error has occurred, the control device 205 advances the process to step S607. The error detected in step S605 will be described later with reference to FIG. 10B, but is not limited to the contents of the description.

In step S607, the control device 205 refers to the URL of the PDL stored in step S605 and determines whether transmission of print job data including the PDL file is designated. If a plurality of PDL files are designated, the determination is performed in the order of designation, and the PDL files undergo the processing one by one. In JDF, if a value that starts with "cid:" is designated in the URL attribute, transmission of print job data including the PDL file is designated. Upon determining that transmission of print job data including the PDL file is designated, the control device 205 advances the process to step S609. Otherwise, the control device 205 advances the process to step S608.

In step S608, the control device 205 refers to the URL of the file stored in step S605 and acquires the arranged PDL file. The acquisition means includes HTTP, SMB, WEBDAV, and the like, and a method designated by the URL is used.

In step S609, the control device 205 determines whether unacquired data of print job data exists. When JDF is transmitted by HTTP, print job data is transmitted in the format of MIME. In MIME, data can be discriminated as parts. Upon determining that unacquired data of print job data exists, the control device 205 advances the process to step S611. Upon determining that all data are acquired, the control device 205 advances the process to step S614.

In step S610, the control device 205 determines whether an error has occurred in the PDL acquisition executed in step S608. Upon determining that an error has occurred, the control device 205 advances the process to step S614. Upon determining that no error has occurred, the control device 205 advances the process to step S612. An example of the error determined in step S610 is a failure in PDL acquisition. However, the present invention is not limited to this.

In step S611, the control device 205 determines whether the type of the unacquired data included in the print job data matches the file type designated by the JDF acquired in step S605. In the MIME format, the file type can be determined by referring to the value of "Content-Type" in the header of the part head. Upon determining that the file types match, the control device 205 advances the process to step S613. Upon determining that the file types do not match, the control device 205 advances the process to step S614.

In step S612, the control device 205 transmits the acquired PDL to a PDL analysis portion created when the control device 205 executes the PDL function program 405. Actually, when a predetermined amount of PDL is read out, the data is sequentially transmitted to the PDL analysis portion, thereby suppressing usage of the storage and memory. When the transmission of the PDL to the PDL analysis portion is ended, the control device 205 advances the process to step S615. Note that the PDL analysis portion is implemented when the CPU of the control device 205 reads out and executes the program stored in the ROM 207 or the HDD 209, but may be implemented by hardware independent of the control device 205.

In step S613, the control device 205 transmits the PDL acquired from the print job data to the PDL analysis portion. When transmitting the PDL in the MIME format, the PDL needs to be decoded before transmission because it is encoded in the format of base64 or the like. In this case as well, the control device 205 transmits a predetermined amount of PDL to the PDL analysis portion. After that, the control device 205 advances the process to step S615.

In step S614, the control device 205 cancels the accepted print job. The control device 205 stops acquisition of PDL data, and requests to delete a job instruction registered in a job management portion that is created when the job management program 411 is executed by the control device 205. If a PDL file is transmitted to the PDL analysis portion, the control device 205 issues a PDL file deletion instruction to the PDL analysis portion. When the print job is canceled, the control device 205 advances the process to step S616.

In step S615, the control device 205 determines whether an unacquired PDL exists. Upon determining that an unacquired PDL exists, the control device 205 returns the process to step S607 to perform processing for the next PDL. On the other hand, upon determining that an unacquired PDL does not exist, the control device 205 advances the process to step S617.

In step S617, the control device 205 determines whether the number of JDF-analyzed jobs is smaller than a predetermined number. The predetermined number of JDF-analyzed jobs is a value needed by the restrictions on resources, and is the number of jobs whose values can be stored after the whole JDF is analyzed. The JDF is analyzed in step S619. When a job is discarded in step S628, the number of JDF-analyzed jobs decreases. Upon determining that the number of JDF-analyzed jobs is smaller than the predetermined number, the control device 205 advances the process to step S619. Otherwise, the control device 205 advances the process to step S618.

In step S618, the control device 205 waits until the number of JDF-analyzed jobs becomes smaller than the predetermined number. The number of JDF-analyzed jobs decreases when a job is discarded in step S630 from jobs that have precedingly undergone JDF analysis. Upon determining that the number of JDF-analyzed jobs has become smaller than the predetermined number, the control device 205 advances the process to step S619.

In step S619, the control device 205 analyzes the JDF stored in the file in step S604. Unlike step S605 in which only the PDL part is analyzed and stored, the method of analysis performed here is not particularly limited. The control device 205 analyzes the whole JDF and stores values. The values stored at this time includes profile information used in color conversion by an input profile and an output profile used in FIG. 7 to be described later. When the analysis is ended, the control device 205 advances the process to step S620.

In step S620, the control device 205 determines whether an error has occurred in the JDF analysis in step S619. The error includes syntax analysis of XML, a designation of an inexecutable job, a designation of prohibition, and the like. Upon determining that an error has occurred, the control device 205 advances the process to step S627. Upon determining that no error has occurred, the control device 205 advances the process to step S621.

In step S621, the control device 205 determines whether the analysis execution resource of the PDL analysis portion is free. The analysis execution resource is defined by, for example, the number of jobs that can simultaneously be analyzed. Upon determining that the analysis execution resource is free, the control device 205 advances the process to step S623. Upon determining that the analysis execution resource is not free, the control device 205 advances the process to step S622.

In step S622, the control device 205 waits until the analysis execution resource of the PDL analysis portion becomes free. The analysis execution resource becomes free when analysis processing of the job that precedingly undergoes PDL analysis is completed. Upon determining that the analysis execution resource is free, the control device 205 advances the process to step S623.

Figure 7:
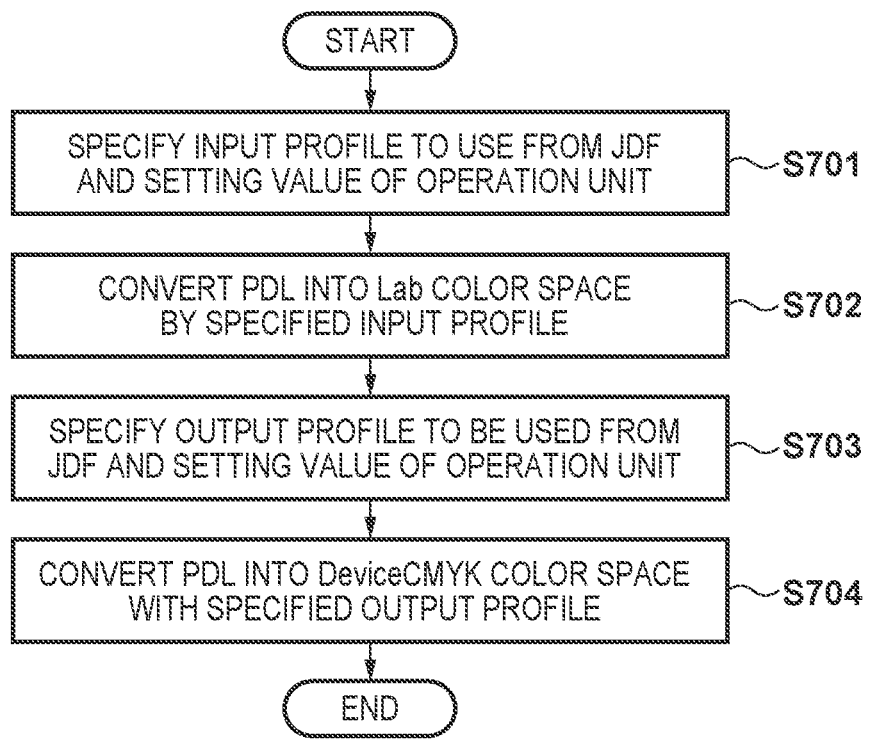
FIG. 7 is a flowchart concerning input/output profile conversion.

In step S623, using the PDL analysis portion, the control device 205 executes analysis of the PDL file linked with the job. PDL analysis is constituted by, for example, RIP processing of creating a print image by reflecting print settings designated by the JDF and print settings set on the operation unit 204. At this time, the print settings designated by the JDF mean the JDF set values stored in step S619. Conversion of the PDL to print data using an input profile and an output profile, which will be described later with reference to FIG. 7, is performed in step S623. When the PDL analysis is completed, the control device 205 advances the process to step S624.

In step S624, the control device 205 determines whether the print resource of the printer unit 201 is free. Normally, the print resource is given to one job that has been accepted earliest in the jobs registered in the job management portion. Upon determining that the print resource is free, the control device 205 advances the process to step S626. Upon determining that the print resource is not free, the control device 205 advances the process to step S625.

In step S625, the control device 205 waits until the print resource of the printer unit 201 becomes free. The print resource becomes free when job printing that is precedingly performed is completed. Hence, when the print resource becomes free, the control device 205 advances the process to step S626.

In step S626, the control device 205 performs print processing of forming the print image created in step S623 on a paper sheet. Print processing sometimes includes pre-processing after print image creation, that is, processing such as imposition. When the print processing is completed, the control device 205 advances the process to step S627.

In step S627, the control device 205 transmits report information representing the print result to a designated transmission destination. The transmission destination may be the information processing apparatus 102 that has accepted the print job data or may be another device on the network. The report information includes at least information representing whether printing is normally completed, whether an error has occurred, and whether printing is ended halfway because of acceptance of a cancel operation. When the JDF is used, the transmission destination is designated as the value of a ReturnJMF attribute in JMF.

In step S628, the control device 205 deletes the job registered in the job management portion. This decreases the number of JDF-analyzed jobs. When the job is discarded, the control device 205 ends the procedure.

<Conversion of PDL into Print Data Using Input/Output Profiles>

Color conversion using an input profile and an output profile in the PDL analysis performed in step S623 will be described with reference to FIG. 7.

In step S701, the control device 205 reads out an input profile set value from the held JDF and specifies the input profile to be used for color conversion. Note that if the JDF includes no input profile setting, or a wrong value is set, an input profile set in advance in the printing apparatus is used for color conversion. After the input profile to be used for color conversion is specified, the process advances to step S702.

In step S702, the control device 205 converts the PDL file using the specified input profile. In this embodiment, the color space is converted into the Lab color space as a device-independent color space. Note that as the color space of PDL data before conversion, the RGB color space or CMYK color space can be considered. After the color space is converted into the Lab color space, the process advances to step S703.

In step S703, the control device 205 reads out an output profile set value from the held JDF and specifies the output profile to be used for color conversion. Note that if the JDF includes no output profile setting, or a wrong value is set, an output profile set in advance in the printing apparatus is used for color conversion. Details of processing of switching the output profile to be used for color conversion based on the output profile set value of the JDF will be described later in steps S806 to S812. After the output profile to be used for color conversion is specified, the process advances to step S704.

In step S704, the control device 205 reconverts the PDL file using the specified output profile. In this embodiment, the Lab color space that is a device-independent color space is converted into the device CMYK color space that is a color space dependent of a color gamut that can be expressed by the printing apparatus 101.

After the PDL is converted into the color space dependent of the printing apparatus 101, the control device ends the color conversion processing.

<Flowchart for Explaining Procedure of Doing Job Setting Concerning Output Profile: When Information Processing Apparatus 102 Judges Presence/Absence of Decoration for Each Page>

A procedure from print job creation by the information processing apparatus to job setting by the control device 205 will be described with reference to FIG. 8. With this procedure, when designating another output profile for a decorated page while applying an MLP, the information processing apparatus 102 creates a print job that designates an output profile for each page.

In step S801, the information processing apparatus 102 loads the information of a PDL to be printed. The loaded information of the PDL is held and expanded, and the process advances to step S802. FIG. 8 shows a case of PDF.

In step S802, the information processing apparatus 102 sets a use medium for each print sheet. Here, step S802 includes imposition setting such as single-sided/double-sided printing for each page. An example of a setting screen will be described later with reference to FIG. 9A. After the use medium and imposition are set, the process advances to step S803.

In step S803, the information processing apparatus 102 sets decoration information. Here, decoration indicates processing of causing a change in the color of a print image by changing the surface properties of a medium, and means, for example, lamination processing or spot color toner such as clear toner or white toner. The decoration information may be set based on PDL data, or may be set anew by the information processing apparatus 102. After decoration information is set for each print page, the process advances to step S804.

In step S804, the information processing apparatus 102 sets an output profile for each print page for which decoration is set in step S803. Note that an output profile may not be set for a print page with a decoration setting, and an output profile may be set for a print page without a decoration setting. To set an output profile, the user may select an arbitrary profile or select an output profile registered for each combination of a medium and decoration. An example of a setting screen in steps S803 and S804 will be described later with reference to FIG. 9B, and an example of a table that holds output profile information registered for each combination of a medium and decoration will be described later with reference to FIG. 9C. After the output profile of the print page is set, the process advances to step S805.

In step S805, the information processing apparatus creates a print job based on the information set in steps S802 to S804, and transmits the print job to the printing apparatus 101 via the external I/F 210. After the transmission of the print job, the process advances to step S806.

From step S806, the procedure of the control device 205 in the printing apparatus 101 to set an output profile for each print page is shown. Note that the expression "apply an output profile (including an MLP)" in steps S806 to S812 means that as the result of whole JDF analysis in step S619, an output profile to be used for color conversion in the PDL analysis of step S623 is held as a JDF set value. The applied output profile is used for color conversion in, for example, the processing shown in FIG. 7.

In step S806, the control device 205 determines whether an output profile is designated in the print job for the print page under output profile setting. More specifically, the control device 205 determines whether an output profile is set by the UserFileName attribute of a "FileSpec" element immediately under the "ColorSpaceConversionParams" element of a color conversion portion 1014 shown in FIG. 10B to be described later. If an output profile is designated, the process advances to step S807. If an output profile is not designated, the process advances to step S808.

In step S807, the control device 205 applies the output profile designated in the print job to the currently set print page. After that, the process advances to step S811.

In step S808, the control device 205 determines whether a medium is designated in the print job for the currently set print page. More specifically, the control device 205 determines whether the ID of the medium registered by a medium information designation portion 1018 is designated by the rRef attribute of a "MediaRef" element immediately under a "DigitalPrintingParams" element of a medium designation portion 1017 shown in FIG. 10B to be described later. If a medium is designated, the process advances to step S809. If a medium is not designated, the process advances to step S810.

In step S809, the control device 205 applies the MLP to the currently set print page. The MLP is linked with the registered medium in advance via the operation unit 204 or the like and stored in the HDD 209. If the linkage is not performed, that is, if no MLP exists, no MLP is applied. After the MLP is applied, the process advances to step S811.

In step S810, the control device 205 applies the output profile set in the printing apparatus to the currently set print page. Here, the output profile set in the printing apparatus indicates the output profile designated by the output profile setting of the operation unit 204. The output profile used in step S810 is sometimes called a default output profile.

In step S811, the control device 205 determines whether there is a next page with respect to the currently set print page. If the next print page exists, the process advances to step S812. If the next print page does not exist, the processing is ended.

In step S812, the control device 205 advances the process to the next print page with respect to the currently set print page, and returns to step S806.

Figure 8:
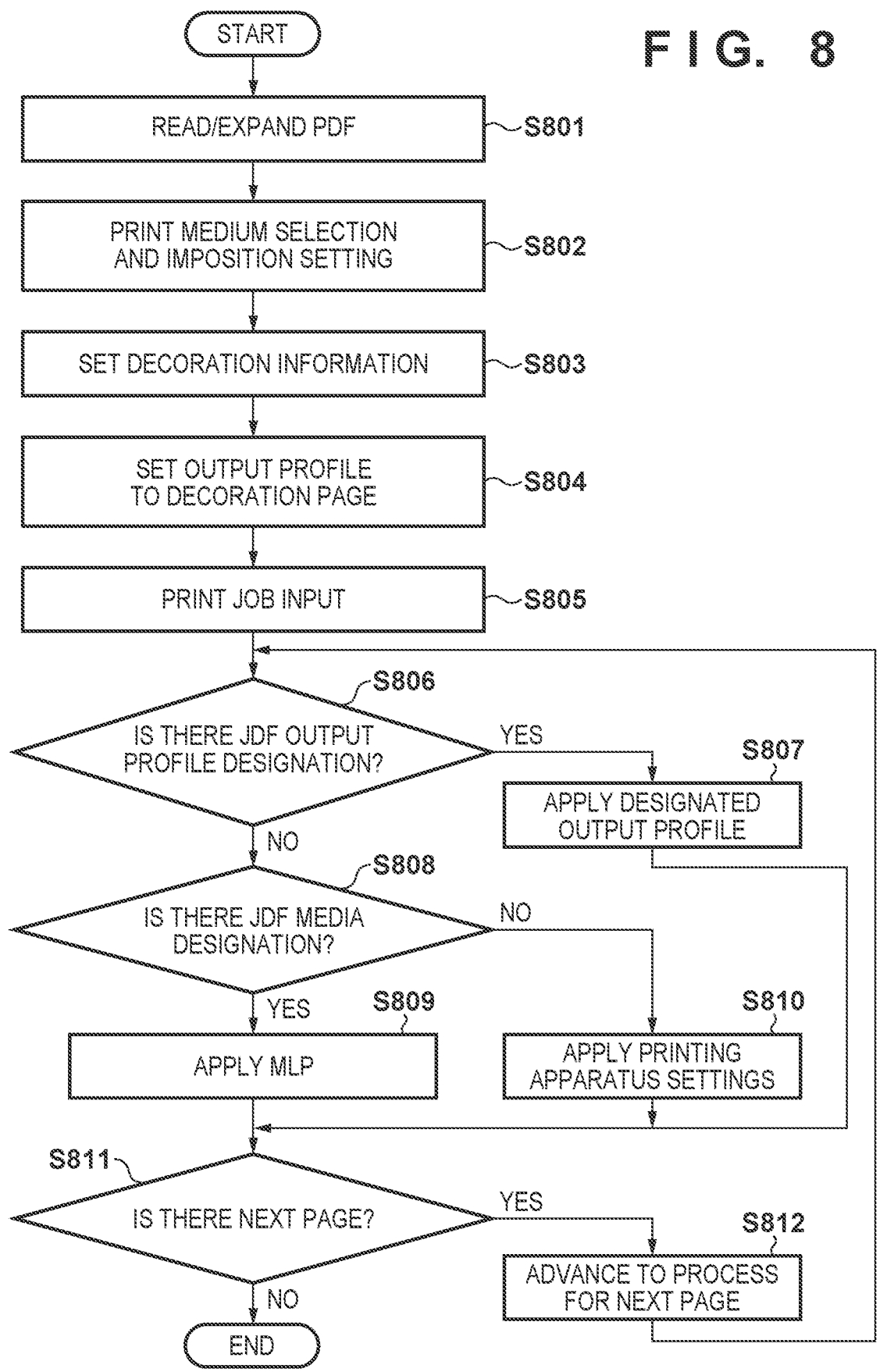
FIG. 8 is a flowchart for explaining a procedure from job ticket creation to job setting.

<UI of Information Processing Apparatus in Processing Shown in FIG. 8 and Output Profile Table>

An example of a setting screen configured to select a medium to be used by the information processing apparatus 102 for printing and set imposition in step S802 will be described with reference to FIG. 9A. In addition, an example of a setting screen used to set decoration and an output profile for the decoration in step S803 will be described with reference to FIG. 9B. Also, a table used to register an output profile to be used for each combination of a medium and decoration in step S804 will be described with reference to FIG. 9C.

Imposition Setting

FIG. 9A is a view showing an example of a screen used to set the type of a medium for a PDL having eight pages in FIG. 8 and set imposition. Paper settings such as a page number, a sheet number, and a medium type (the type of a medium to be used) are displayed on the left side, and a preview of a print image on which the settings on the left side are reflected is displayed on the right side. Here, the sheet number is incremented by one every time the page number is incremented by two. This means that a page is imposed on each of the obverse and reverse surfaces of a sheet. The medium type is described only for page 1. This means that the same medium is used for the subsequent pages. To designate a different medium, the medium type is set in the medium type field of the page. For example, if "Paper2" is designated for page 3 and page 4 in the setting state shown in FIG. 9A, "Paper2" is additionally displayed in the medium type field of page 3, and "Paper1" is additionally displayed in the medium type field of page 5. Note that if a medium type is not designated, a setting to "not designate" can be done.

Also, from page-specific settings 901, a sheet can be inserted before a page, or a page can be deleted. When "advanced page settings" is selected in the page-specific settings 901, the screen transitions to an advanced page setting screen shown in FIG. 9B.

Advanced Page Settings

FIG. 9B shows a screen transitioned as the result of selection of "advanced page settings" in FIG. 9A, and a medium type, decoration, and input/output profiles are set for the page.

A medium type designation portion 911 can set the medium type of the page. Note that the medium type set here is reflected on the medium type setting in FIG. 9A as well.

A decoration information designation portion 912 using PDL information sets decoration information of the page based on decoration information added to the PDL. This function can be enabled by a check box. If no check is made, the function is disabled, and the decoration information display portion is grayed out as shown in FIG. 9B.

In a decoration information designation portion 913 by a user designation, the user himself/herself sets decoration information to be used for the page. If the decoration information designation portion 912 using PDL information is enabled, the decoration information designation portion 913 is disabled and grayed out.

As for setting of an input profile and an output profile, to use profiles set in the printing apparatus, items "comply with the settings of the device" in designation portions 914 and 916 are checked, respectively. On the other hand, to set profiles by user setting, arbitrary input and output profiles are selected from pull-down menus 915 and 918, respectively. As for the output profile, in addition to the designation portions 916 and 918, an output profile designation portion 917 linked with a medium and decoration can be used to set the output profile. If the designation portion 917 is checked, an output profile linked with the combination of a medium type designated by the medium type designation portion 911 and decoration designated by the decoration information designation portion 912 or 913 can be loaded from a separately held registration table. The structure of the held table is shown in FIG. 9C to be described later.

Note that if the designation portion 917 is set for the output profile, the MLP set in the printing apparatus 101 may be applied to a page for which no decoration is set. For this purpose, the type of a print medium is set for the page in the JDF. If the designation is made for a plurality of pages, the page is included in the setting target, as a matter of course. Also, for example, if the designation portion 916 is set for the output profile, the output profile need not be set for the page in the print job. When the printing apparatus 101 processes a page for which no output profile is set, the output profile set in the printing apparatus 101 can be used. Setting of the output profile in the printing apparatus 101 will be described later with reference to, for example, FIG. 15. This setting includes setting of an MLP associated with a print medium type and a decoration output profile associated with a print medium type and a decoration processing type. The setting may also include setting of a prescribed (or predetermined) output profile to be used for a page for which a print medium type is not designated.

Decoration Output Profile

The structure of a table (decoration output profile table) that holds the registration information of output profiles according to decoration types for each medium will be described with reference to FIG. 9C.

A medium table 921 holds a list of registered medium types. It is also possible to hold a list of output profiles according to decoration types in linkage with each medium type.

Output profile tables 922, 923, and 924 according to decoration are linked with each medium type of the medium table, as described above. Note that an output profile to be used when decoration does not exist, that is, a normal MLP may be registered. An output profile according to decoration may not be registered. If an output profile is not registered, the output profile designation portion 917 linked with a medium and decoration cannot be set for the combination of the medium and decoration.

Figure 9C:
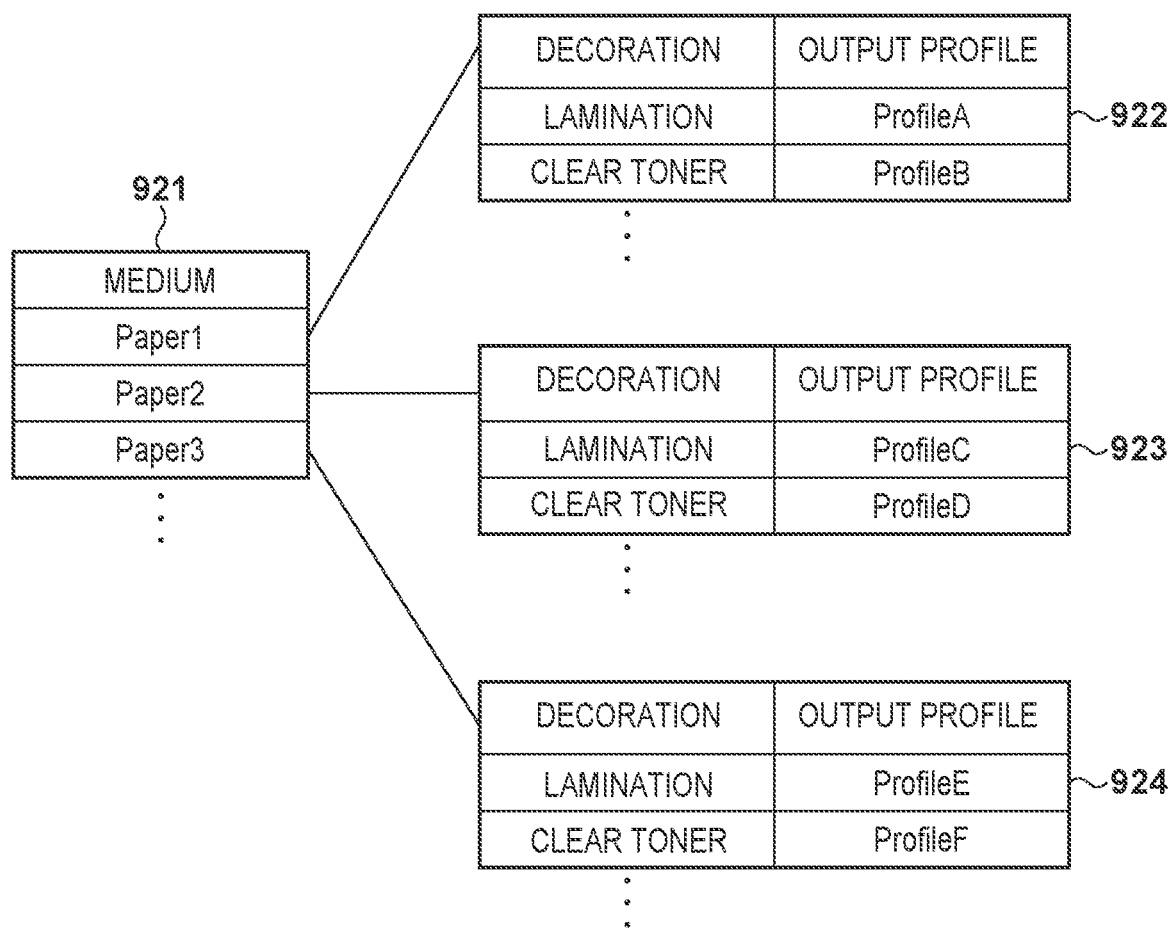
FIG. 9C is a view showing a table in which an output profile that changes depending on the type of decoration is linked with each medium.

The table shown in FIG. 9C may be set by, for example, the information processing apparatus 102 based on the type of a print medium usable in the printing apparatus 101, the type of usable decoration, and a usable profile. For this purpose, for example, lists may be displayed, and desired combinations may be selected from the lists by an operator, linked with each other, and stored as a decoration output profile table. Alternatively, a sample of a printed product that has undergone decoration processing is read by a scanner, and the read color and the color of a submitted original are compared to create a profile for correction. The created profile for correction may be combined with the output profile used at the time of printing of the sample to create a new output profile. The created new output profile may be associated with the type of decoration processing and the type of the print medium used in the printed product and stored as the decoration output profile table.

<Configuration of Print Job Data and Schematic View of JDF Transmitted in Step S805>

The structure of print job data received from the information processing apparatus 102 and JDF will be described with reference to FIGS. 10A and 10B.

Figure 10A:
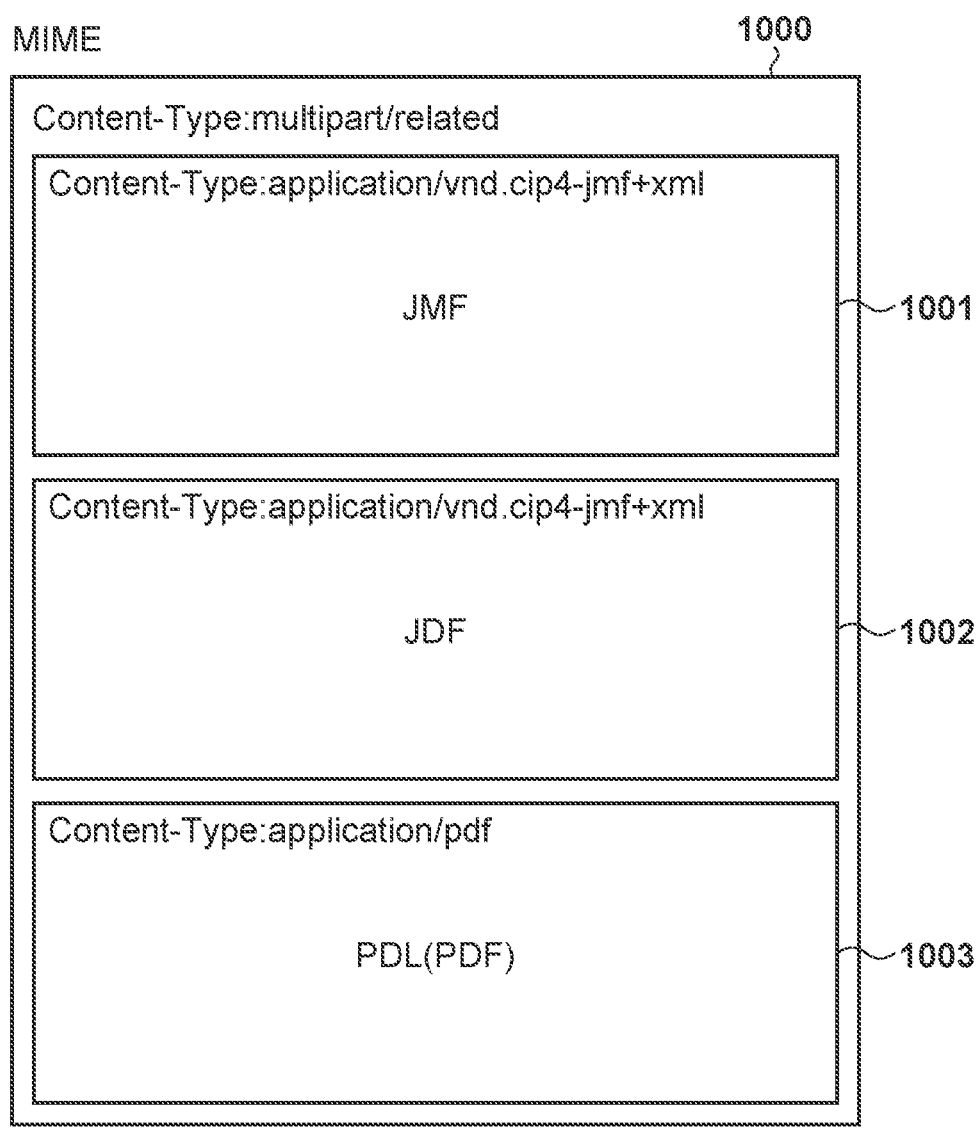
FIG. 10A is a view showing the configuration of data transmitted from the information processing apparatus in response to a job request.

FIG. 10A shows the configuration of print job data when it is a print instruction request using JDF.

MIME data 1000 connects JMF, JDF, and PDL files, which form print job data, by a format called MIME. MIME is a method designed to handle various files by email. The files that form MIME are connected as parts separated by character strings called boundary. A part header exists at the start of each part, and the information of a file included in the part and the like are described in the part header.

A JMF part 1001 is a MIME part storing a JMF file. In this embodiment, a case in which the JMF is Command-SubmitQueueEntry for performing a print instruction will be described. It is only the JMF part that always needs to be included in MIME for implementation of this embodiment. The JMF part 1001 always needs to be included in the first part of MIME. However, if only the JMF part exists, the MIME format need not always be used.

A JDF part 1002 is a MIME part storing a JDF file. All designations concerning designations of printing can be described in the JDF. The JDF will be described using an example shown in FIG. 10B. Note that there is a method of designating a URL where the JDF is arranged without simultaneously transmitting the JDF in the JMF. If this designation method is used, the JDF part is not included in the MIME 1000.

A PDL part 1003 is a MIME part storing a PDL file. FIG. 10A shows a case of a PDF. Unlike the JMF and JDF, a plurality of PDL parts 1003 can be included in the MIME 1000, or the MIME 1000 may include no PDL part at all. The number of PDL parts 1003 is the number of files for which simultaneous transmission is designated in the PDL file designation described in a PDL portion 1012 (see FIG. 10B). If the number does not match that in the designation of the PDL portion 1012, and the number of PDL parts is smaller, an error is detected in step S609. If the PDL part is binary data, it always needs to be encoded by a format such as base64.

FIG. 10B is a view showing an example of a JDF portion of a print job transmitted in step S805. Although a variety of print designations can be done in the JDF, only portions associated with the embodiment will be described here. That is, the elements that can be designated are not limited to the contents of the description. Also, designated attributes and values thereof are merely examples, and are not limited to the description. Note that since omitted portions exist in the JDF shown in FIG. 10B, if it is directly transmitted as a job, an error is detected in JDF analysis.

A JDF portion 1011 is a portion described by JDF elements. The JDF always needs to be described from the JDF portion 1011. If the root element is not JDF, an XML syntax error is detected in step S605.

A PDL portion 1012 is a portion that designates a PDL file to be used for printing. In this embodiment, designation of the PDL portion is essential. If the PDL portion 1012 is not designated, a PDL designation absence error is detected in step S605.

An imposition portion 1013 is a portion that designates how to impost the PDL to a medium. Here, "TwoSideFlipY" is designated by the Sides attribute, and this means that imposition is performed for both surfaces while setting images on the obverse surface and the reverse surface in the same direction.

The color conversion portion 1014 includes "ColorSpaceConversionParams" as a root element. The color conversion portion 1014 includes two elements, that is, page-specific color conversion portions 1015 and 1016 in which the same "ColorSpaceConversionParams" as that of the root element is nested. Only one color conversion portion 1014 of the root element can be designated, but a plurality of page-specific color conversion portions can be designated. By the PartIDKeys attribute, an attribute for specifying the application range of the nested color conversion portion is set.

The page-specific color conversion portion 1015 sets a PDL page number by a RunIndex attribute in the "ColorSpaceConversionParams" element, and sets an output profile by a UserFileName attribute in a "FileSpec" element. This also applies to the page-specific color conversion portion 1016. As the PDL page number designated by the RunIndex attribute, the first page of the PDL page is set to 0. FIG. 10B shows the PDL page numbers as "0 to 1" and "7 to 7". Hence, the second page and the eighth page from the first page are designated. Note that the designated pages need to be continuous, and fall within the range of the total number of pages of the PDL file designated by the PDL portion.

The medium designation portion 1017 is a portion that designates a medium to be used for printing, and the medium to be used is designated by an rRef attribute in a "MediaRef" element. Here, "MED 000" is designated by the rRef attribute. This is an ID assigned to medium information set by the medium information designation portion to be described later. Note that like the color conversion portion 1014, the medium designation portion 1017 can designate a medium for each page by having a child element. The medium designation portion 1017 designates "MED 000" for the whole PDL.

The medium information designation portion 1018 is a portion that designates medium information to be used for printing. In FIG. 10B, a medium size is set by a Dimension attribute in a "Media" element, a medium name is set by a DescriptiveName attribute, and the ID of the medium is set by an ID attribute. In FIG. 10B, only one piece of medium information is set. To perform printing using a plurality of media, a plurality of "Media" elements are set. In addition, the medium designation portion 1017 designates a medium to be used for each page by a medium ID, like the page-specific color conversion portions 1015 and 1016. Hence, the ID of each element needs to be uniquely set.

<Flowchart for Explaining Procedure of Doing Job Setting Concerning Output Profile: When Control Device 205 Judges Presence/Absence of Decoration for Each Page>

In FIG. 8, the information processing apparatus 102 judges the presence/absence of decoration for each page and designates an output profile. The judgement of the presence/absence of decoration may be performed on the MFP side. A procedure of job setting in a case in which when designating another output profile for a decorated page while applying an MLP, the information processing apparatus 102 creates a print job in which an output profile for each decoration type is designated for each medium will be described with reference to FIG. 11.

In step S1101, the information processing apparatus 102 sets a use medium for each print sheet. After the medium is set, the process advances to step S1102.

In step S1102, the information processing apparatus 102 sets an output profile to be used for each decoration linked with the use medium set in step S1101. A method of setting an output profile from the combination of a medium and decoration will be described later with reference to FIGS. 12 and 13B. After the output profile for the decoration of the use medium is set, the process advances to step S1103.

In step S1103, the information processing apparatus creates a print job based on the information set in steps S1101 and S1102, and transmits the print job to the printing apparatus 101 via the external I/F 210. After the transmission of the print job, the process advances to step S1104.

From step S1104, the procedure of the control device 205 to set an output profile for each print page is shown. Note that "apply an output profile (including an MLP)" in steps S1104 to S1111 means that as the result of whole JDF analysis in step S619, an output profile to be used for color conversion in the PDL analysis of step S623 is held as a JDF set value.

Figure 11:
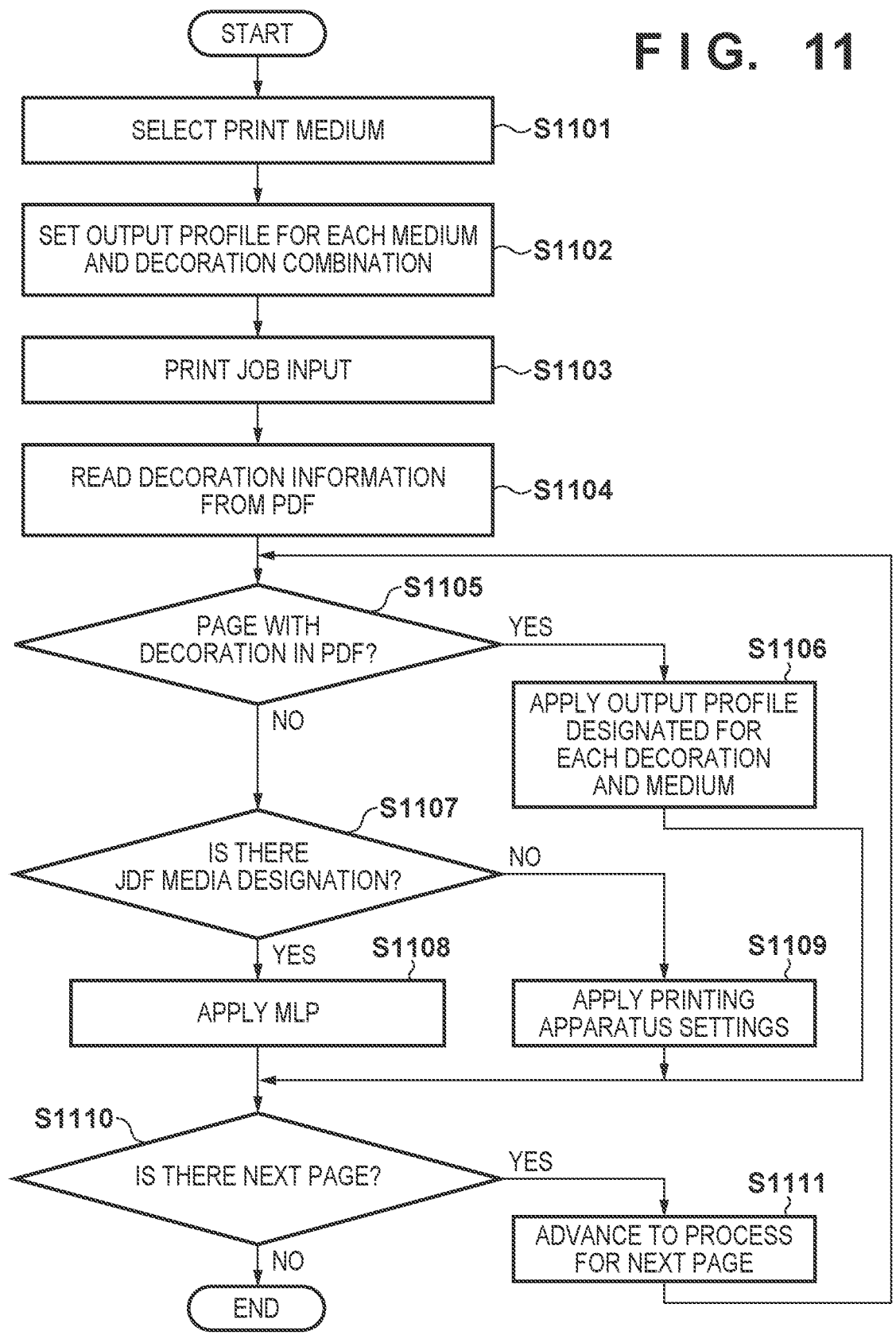
FIG. 11 is a flowchart for explaining a procedure from job ticket creation to job setting.

In step S1104, the control device 205 loads decoration information from the received PDL. FIG. 11 shows a case of PDF. It is considered that the decoration information of PDL is held as, for example, properties or metadata. However, the present invention is not limited to this. After the decoration information is loaded, the process advances to step S1105.

In step S1105, the control device 205 determines whether the decoration information loaded in step S1104 is set for the print page under output profile setting. If the decoration information is set, the process advances to step S1106. If the decoration information is not set, the process advances to step S1107.

In step S1106, the control device 205 applies an output profile according to decoration for each medium designated by the JDF to the currently set print page. Note that if the decoration information set in the PDL does not match the decoration designated for the medium in the JDF, or if a decoration designation itself does not exist, the process is omitted. After the application of the output profile, the process advances to step S1110.

In step S1107, the control device 205 determines whether a medium is designated in the print job for the currently set print page. If a medium is designated, the process advances to step S1108. If a medium is not designated, the process advances to step S1109.

In step S1108, the control device 205 applies the MLP to the currently set print page. The MLP is linked with the registered medium in advance via the operation unit 204 or the like and stored in the HDD 209. If the linkage is not performed, that is, if no MLP exists, no MLP is applied. After the MLP is applied, the process advances to step S1110.

In step S1109, the control device 205 applies the output profile set in the printing apparatus to the currently set print page. Here, the output profile set in the printing apparatus indicates the output profile designated by the output profile setting of the operation unit 204.

In step S1110, the control device 205 determines whether there is a next page with respect to the currently set print page. If the next print page exists, the process advances to step S1111. If the next print page does not exist, the processing is ended.

In step S1111, the control device 205 advances the process to the next print page with respect to the currently set print page, and returns to step S1105. Note that although in FIG. 11, the process returns to step S1105, the process may return to step S1104 depending on the data format of the decoration information of the PDL. In this case, the process of step S1104 is performed for each print page.

<Setting Screen in Steps S1101 and S1102>

An example of a setting screen of the information processing apparatus that performs settings in step S1101 and S1102 will be described with reference to FIG. 12. As in FIG. 9A, a medium type to be used is set for each sheet.

When a medium type is set, an item "use output profile based on registered table" in the lower portion of the setting screen can be set. The item is enabled by a check box, profile information for each decoration linked with a medium is acquired from a table similar to that shown in FIG. 9C and reflected on the print job settings.

<Schematic View of JDF Transmitted in Step S1103>

An example of a JDF portion of a print job transmitted in step S1103 and a creation method thereof will be described with reference to FIGS. 13A and 13B.

FIG. 13A shows an example of a JDF portion of a print job transmitted in step S1103. Note that portions different from FIG. 10B are mainly extracted, and omitted portions are the same as in FIG. 10B. Only color conversion portions will be described below.

A color conversion portion 1301 includes two elements, that is, medium and decoration type-specific color conversion portions 1302 and 1303 as child elements.

In the medium and decoration type-specific color conversion portions 1302 and 1303, a decoration type is designated by a cj:Scope_Decorationg attribute, and a medium to which an output profile is applied is designated by a cj:Media_ID attribute. Also, like the page-specific color conversion portions 1015 and 1016, an output profile applied for each medium type and each decoration type is set by the User-FileName attribute in the "FileSpec" element. The medium and decoration type-specific color conversion portions are created as many as the number of items of the output profile table according to the decoration linked with the medium to be used in the medium table 921.

Figure 13B:
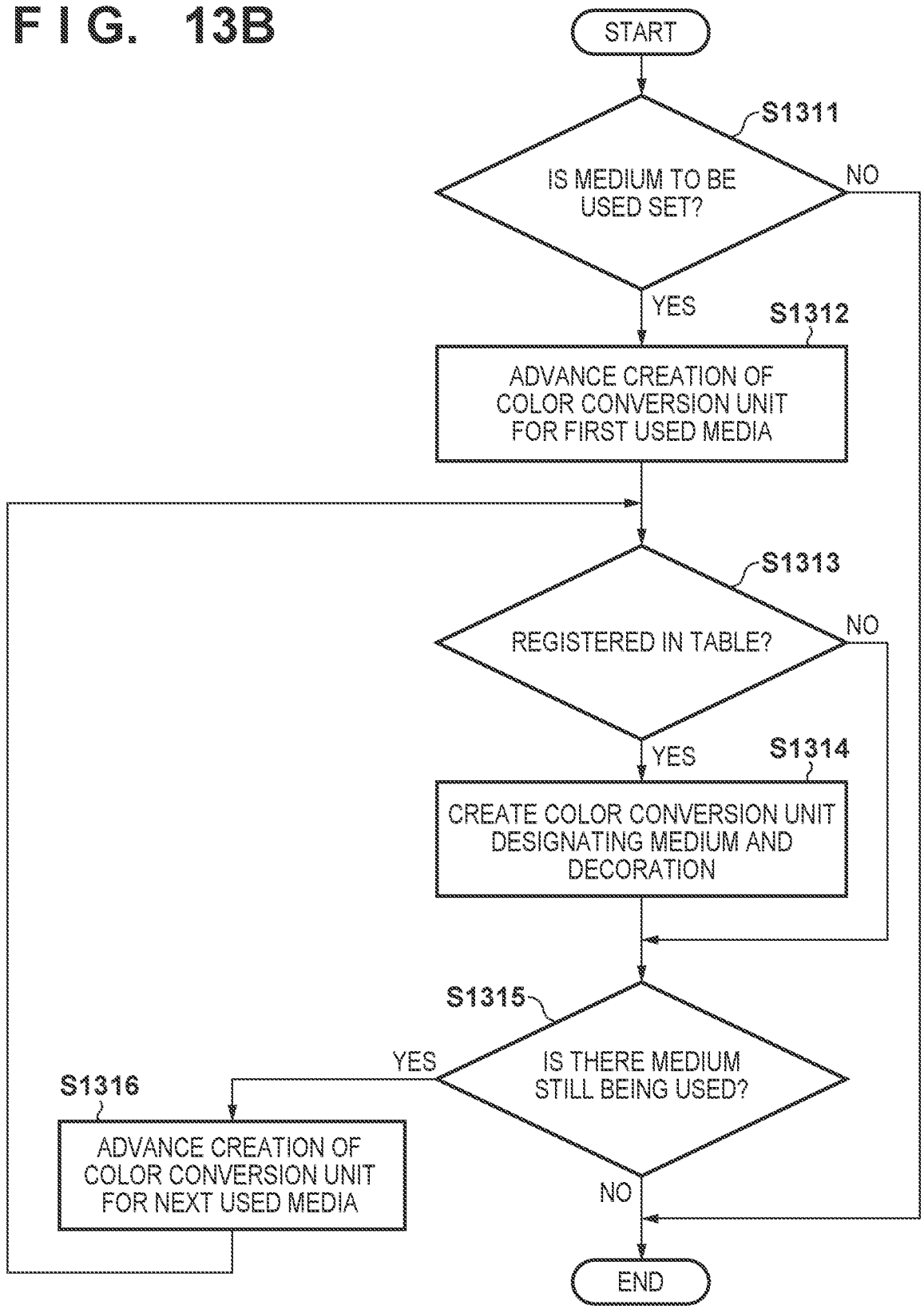
FIG. 13B is a flowchart of creating color conversion portions of JDF based on an output profile.

FIG. 13B shows a procedure of creating the color conversion portions shown in FIG. 13A by the information processing apparatus 102.

Figure 12:
FIG. 12 is a view showing an example of a UI configured to set use of an output profile linked with a print medium and decoration.

In step S1311, the information processing apparatus 102 determines whether a medium type is set on the setting screen shown in FIG. 12. If a medium type is set for a sheet, the process advances to step S1312. If a medium type is not set for any sheet, the processing is ended.

In step S1312, the information processing apparatus 102 advances to creation of a color conversion portion for a medium to be printed first in the set medium types. After that, the process advances to step S1313.

In step S1313, the information processing apparatus 102 determines whether an output profile table according to decoration is linked with the medium under creation of the color conversion portion. If an output profile table is linked, the process advances to step S1314. If an output profile table is not linked, the process advances to step S1315.

In step S1314, the information processing apparatus 102 creates a color conversion portion that uses a medium type and a decoration type for judgement when applying an output profile. After creation of the color conversion portion, the process advances to step S1315.

In step S1315, the information processing apparatus 102 determines whether a medium for which a color conversion portion is not yet created exists. If a medium for which a color conversion portion is not yet created exists in the set media, the process advances to step S1316. If the color conversion portion processing is performed for all set media, the processing is ended.

In step S1316, the information processing apparatus 102 advances to creation of a color conversion portion for a next medium to be printed with respect to the currently set medium. After that, the process returns to step S1313.

<View Showing Application Result of JDF Shown in FIGS. 10B and 13A>

FIG. 14 is a view showing an application result of an output profile in a case in which for a PDF of a total of eight pages, the JDF shown in FIG. 10B, which is generated by the information processing apparatus 102 in accordance with the procedure shown in FIG. 8, is analyzed by the control device 205 in accordance with the procedure. Note that for Paper1 that is the medium whose information is designated by the medium information designation portion 1018, ProfileX is registered as an MLP on the operation unit 204.

Assume a case in which lamination processing is performed for the first sheet, and clear toner is used for the eighth page. In this case, ProfileA can be applied to the sheet for which lamination processing is performed, and ProfileB can be applied to the page for which clear toner is used. ProfileX that is an MLP can be applied to each page that does not undergo decoration and uses a normal MLP.

Note that FIG. 14 can be considered as a view showing an output profile to be applied to a PDF of a total of eight pages having information representing that lamination processing is performed for the first and second pages, and clear toner is used for the eighth page. The output profile to be applied is specified when the JDF shown in FIG. 13A, which is generated by the information processing apparatus 102 in accordance with the procedure shown in FIG. 11, is analyzed by the control device 205 in accordance with the procedure.

<Example of Setting when Output Profile Setting Shown in FIG. 13A is Done on Operation Unit 204>

FIG. 15 shows an example of setting when output profile designation for each medium type and each decoration type, which is set in the JDF in FIG. 13A, and normal MLP designation are performed on the operation unit 204 of the printing apparatus 101. A profile for decoration may be designated not in a print job but on the operation unit 204.

In the screen shown in FIG. 15, in addition to the default output profile (without decoration), an output profile for each decoration type can be selected from candidates and set. However, since the setting shown in FIG. 15 can be done for each medium type, "default" means an MLP (Media Link Profile) for the type of the medium of the setting target. If an output profile is set on the operation unit 204, as shown in FIG. 15, the set medium type and decoration type and the identification information of the output profile are associated and stored in, for example, the HDD 209. The format of storage may be the same as the decoration output profile table shown in FIG. 9C.

For example, in step S703 of FIG. 7, if an output profile is not set for each page included in the print job, the output profile table set from the screen shown in FIG. 15 and stored in the printing apparatus 101 is referred to. A corresponding output profile is specified, and color conversion processing is performed in step S704 using the specified output profile. Here, for example, it is determined first whether a print medium type and a decoration processing type are set in the JDF, and an output profile corresponding to the settings is specified. If no corresponding output profile exists, or if only a print medium type is set, an MLP is specified as an output profile to be used. If the print medium type is not set, or if an MLP is not set, a prescribed (default or predetermined) output profile may be specified and used. Note that in the screen shown in FIG. 15, a prescribed output profile for a page for which a medium type is not set in JDF or the like may be set.

With the above-described configuration, according to this embodiment, it is possible to set an output profile in linkage with a print medium type and a decoration processing type. At the time of printing, if a page corresponding to the set print medium type and decoration type exists, color conversion is performed for the page using the set output profile. On the other hand, for the remaining pages, color conversion is performed using a default output profile or an output profile according to the medium type. It is therefore possible to suppress a deviation of a printed color from the color of a submitted original, which occurs due to decoration. Also, when generating a print job, the print medium type and the decoration type are associated with an output profile, and a media link profile is defined. It is therefore possible to set an output profile by a simple operation in addition to decoration setting.

Modification

Note that in the above-described embodiment, an output profile is assumed to be designated for each page. However, when decorating only a part of a page, output profile designation may be done for a single object or each object attribute in the page. When the processing of the control device 205 after the printing apparatus 101 receives JDF similar to that in FIG. 13A is changed, an output profile to be applied can be set for each object or each object attribute.

<Flowchart of Applying Output Profile to Each Object by Control Device 205 without Changing JDF Job Itself Generated in Steps S1101 to S1103>

A procedure of setting an output profile to be applied for each object attribute will be described with reference to FIG. 16. Note that the basic procedure is the same as in FIG. 11, and a description of the portions with the same processes as in FIG. 11 will be omitted.

Processes of steps S1601 to S1603 are the same as those of steps S1101 to S1103, respectively.

In step S1604, the control device 205 loads the decoration information of a print page under analysis processing of a received PDL. FIG. 16 shows a case of PDF. Note that the decoration information here is held by each object in the print page. As a method of holding decoration information by an object, for example, holding information as object metadata can be considered. However, the present invention is not limited to this. After the decoration information is loaded, the process advances to step S1605.

In step S1605, the control device 205 judges, based on the information loaded in step S1604, whether an object (decorated object) with decoration information exists in the print page under analysis processing. If a decorated object exists, the process advances to step S1606. If a decorated object does not exist, the process advances to step S1607.

Processes of steps S1607 to S1611 are the same as those of steps S1107 to S1111, respectively.

In step S1606, for the decorated object under analysis processing, which is loaded from the PDL, the control device 205 collates the type of the decoration and a medium type that is designated in the print job of the processing target and is to be used for the print page with the values set in step S1602. The values set in step S1602 are obtained by, for example, referring to the received JDF. By the collation, an output profile corresponding to the medium type and the decoration type is specified. An output profile is thus specified, and the specified output profile is applied to the decorated object.

If the combination of the medium type and the decoration type in the decoration information of the PDL does not match that in the settings of the print job, the processing is omitted. Note that the expression "apply" here means that as the result of whole JDF analysis in step S619, an output profile to be used for color conversion in the PDL analysis of step S623 is held as a JDF set value. After the output profile is applied to the decorated object under analysis processing, the process advances to step S1612.

In step S1612, the control device 205 determines whether a decorated object that has not undergone the analysis processing exists in the print page under analysis processing. If a decorated object that has not undergone the analysis processing exists, the process advances to step S1613. If such a decorated object does not exist, the process advances to step S1610.

In step S1613, the control device 205 advances to analysis processing of the next decorated object that has not undergone the analysis processing. After that, the process returns to step S1606.

Figure 16:
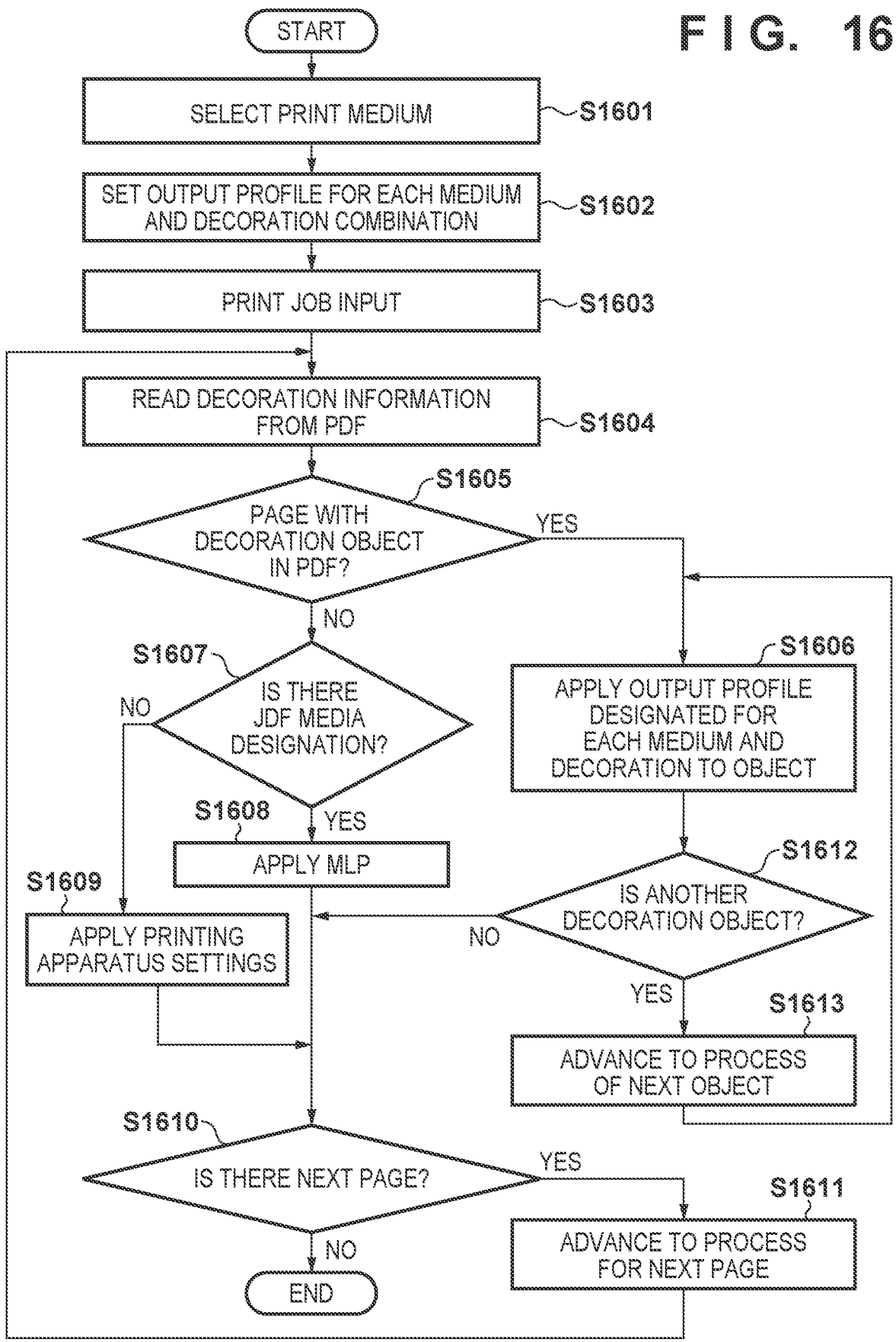
FIG. 16 is a flowchart when setting decoration for only a part of a page.

Note that in the procedure shown in FIG. 16, the same processing can be performed even if "object" is replaced with "object attribute" such as text or graphic. In this case, decoration information is held not as object metadata but as the properties of the whole PDL or the like.

As described above, in this modification, for each decorated object, an output profile linked with the type of the decoration is applied. Note that decoration processing is performed on an object basis or only on a page basis depending on the type of decoration. For example, lamination is performed on a page basis (or on a sheet basis). Hence, depending on the type of decoration, a decorated object is not specified, and an output profile linked with decoration may be applied on a page basis.

As described above, according to this embodiment, while using an output profile linked with a medium, use of another output profile for a decorated page or a decorated object is enabled, thereby preventing a change in a color caused by decoration. This makes it possible to reproduce a color desired by the user more flexibly.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2020-200507, filed Dec. 2, 2020 which is hereby incorporated by reference herein in its entirety.

What is claimed is:

1. A printing apparatus comprising:
a storage that stores a table that associates a type of a print medium with an output profile;
a memory that stores a set of instructions; and
at least one processor that executes the set of instructions to:
determine for each page contained in the print job whether or not output profile information designating an output profile is included in a predetermined area of a print job to be processed;
perform color conversion for a page determined to include the output profile information using the output profile designated by the print job without referring to the table and printing in a case where it is determined that the output profile information designating the output profile is included in the print job; and
referring to the table, perform color conversion for a page determined not to include the output profile information using the output profile associated with a type of a print medium and printing in a case where it is determined that the output profile information designating the output profile is not included in the print job.

2. The apparatus according to claim 1, wherein
the table further includes association between the type of the print medium, a type of decoration processing, and the output profile, and
for a page included in the print job, if the type of the print medium and the type of the decoration processing are set in the print job, and an output profile is not set in the print job, the processor refers to the table, and performs color conversion using an output profile associated with the type of the print medium and the type of the decoration processing set for the page.

3. The apparatus according to claim 2, wherein for the page included in the print job for which the type of the print medium and the type of the decoration processing are set in the print job, and an output profile is not set in the print job, if an output profile associated with the type of the print medium and the type of the decoration processing does not exist in the table, the processor performs color conversion using an output profile associated with the type of the print medium.

4. The apparatus according to claim 3, wherein for the page included in the print job for which the type of the print medium and the type of the decoration processing are set in the print job, and an output profile is not set in the print job, if an output profile associated with the type of the print medium does not exist in the table, the processor performs color conversion using a predetermined output profile.

5. The apparatus according to claim 1, wherein for a page included in the print job, if a type of the print medium is not set in the print job, and an output profile is not set in the print job, the processor performs color conversion using a predetermined output profile.

6. The apparatus according to claim 1, wherein
the output profile associated with the type of the print medium and the type of decoration processing are set in the print job, and
if the decoration processing is set for an object of the page included in the print job, the processor performs color conversion for the object using the output profile associated with the type of the print medium and the type of the decoration processing of the page.

7. The apparatus according to claim 1, wherein the processor selects the type of the print medium and the output profile associated with the type of the print medium, and stores the selected type of the print medium in the table in association with the selected output profile.

8. The apparatus according to claim 7, wherein the processor further selects the type of decoration processing and further stores the selected type of the decoration processing in the table in association with the selected type of the print medium and the selected output profile.

9. A non-transitory computer-readable medium that stores a program that when executed on a computer causes the computer to:
- store a table that associates a type of a print medium with an output profile;
- determine for each page contained in the print job whether or not output profile information designating an output profile is included in a predetermined area of a print job to be processed;
- perform color conversion for a page determined to include the output profile information using the output profile designated by the print job without referring to the table and printing in a case where it is determined that the output profile information designating the output profile is included in the print job; and
- referring to the table, perform color conversion for a page determined not to include the profile information using the output profile associated with a type of a print medium and printing in a case where it is determined that the output profile information designating the output profile is included in the print job.

10. A printing system including an information processing apparatus configured to create a print job and a printing apparatus configured to perform printing by executing the print job,
the information processing apparatus comprising:
- a storage that stores a first table that associates a type of a print medium, a type of decoration processing, and an output profile;
- at least one memory that stores at least one program; and
- at least one processor, the at least one program causing the at least one processor to function as:
  - a creation unit that sets the type of the print medium and the type of the decoration processing for each page and creating, by referring to the first table, a print job in which the output profile of a page for which the decoration processing is set; and
  - a transmitting unit that transmits the print job to the printing apparatus, and the printing apparatus comprising:
- a storage that stores a second table that associates a type of a print medium with an output profile; and
- a processor that performs, for each page included in the print job, color conversion using an output profile for a page for which an output profile is set in the print job, and performs color conversion using an output profile associated with the type of the print medium set for the page by referring to the second table for a page for which the output profile is not set in the print job, and for executing printing.

11. The apparatus according to claim 1, wherein the determination is made as to whether the output profile is stored in a predetermined area of Job Definition Format (JDF) of the print job.

12. The non-transitory computer-readable medium according to claim 9, wherein the determination is made as to whether the output profile information designating the output profile is stored in a predetermined area of Job Definition Format (JDF) of the print job.

* * * * *